US009680719B2

(12) United States Patent
Hato

(10) Patent No.: US 9,680,719 B2
(45) Date of Patent: Jun. 13, 2017

(54) COMMUNICATION SYSTEM, CLIENT TERMINAL, AND SERVER

(75) Inventor: Jumpei Hato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 362 days.

(21) Appl. No.: 14/380,740

(22) PCT Filed: May 24, 2012

(86) PCT No.: PCT/JP2012/063314
§ 371 (c)(1),
(2), (4) Date: Aug. 25, 2014

(87) PCT Pub. No.: WO2013/175607
PCT Pub. Date: Nov. 28, 2013

(65) Prior Publication Data
US 2015/0026244 A1    Jan. 22, 2015

(51) Int. Cl.
*G06F 15/16* (2006.01)
*H04L 12/26* (2006.01)
(Continued)

(52) U.S. Cl.
CPC ............ *H04L 43/045* (2013.01); *H04L 67/32* (2013.01); *H04L 67/42* (2013.01); *H04L 69/321* (2013.01)

(58) Field of Classification Search
CPC ..... H04L 43/045; H04L 69/321; H04L 67/32; H04L 67/42
See application file for complete search history.

(56) References Cited

U.S. PATENT DOCUMENTS 5,341,477 A * 8/1994 Pitkin .................... G06F 9/505
                                                    709/203
5,758,087 A    5/1998 Aaker et al.
(Continued)

FOREIGN PATENT DOCUMENTS

CN      102202050 A     9/2011
JP      4-369076        12/1992
(Continued)

OTHER PUBLICATIONS

Combined Chinese Office Action and Search Report issued May 4, 2016 in Patent Application No. 201280072376.2 (with partial English language translation and English translation of categories of cited documents).

(Continued)

*Primary Examiner* — John B Walsh
(74) *Attorney, Agent, or Firm* — Oblon, McClelland, Maier & Neustadt, L.L.P.

(57) ABSTRACT

A batch request processing device that, when a response corresponding to a performance request issued by a GUI processing device is stored in a response storage device, outputs an output command for outputting the response to the GUI processing device, whereas when no response corresponding to the performance request is stored in the response storage device, commands a request pattern management device to predict a request which may be issued following the performance request and generate a request pattern which consists of the performance request and the predicted request, and generates a batch request including the request pattern generated by the request pattern management device.

18 Claims, 24 Drawing Sheets

(51) Int. Cl.
*H04L 29/06* (2006.01)
*H04L 29/08* (2006.01)

(56) References Cited

U.S. PATENT DOCUMENTS 5,878,223 A * 3/1999 Becker .............. G06F 17/30902
707/E17.12
2011/0238921 A1 9/2011 Allen et al.

FOREIGN PATENT DOCUMENTS

| | | |
|---|---|---|
| JP | 7-160462 | 6/1995 |
| JP | 10-69468 | 3/1998 |
| JP | 2002-116032 | 4/2002 |
| JP | 2005-56284 | 3/2005 |
| JP | 2005-228228 | 8/2005 |
| WO | 2011/077642 A1 | 6/2011 |

OTHER PUBLICATIONS

International Search Report issued Jun. 19, 2012, in PCT/JP2012/063314, filed May 24, 2012.

* cited by examiner

FIG.8

Data Structure of Elements of
Request Time Series Analysis Results

| Real Request Information | Succeeding Pattern List |
|---|---|

Data Structure of Elements of Succeeding Pattern List

| Reliability Parameter | Subsequent Pattern |
|---|---|

FIG.9

| Real Request Information | Reference to Succeeding Pattern Management Data | Reference to Next Real Request |
|---|---|---|

FIG.10

| Succeeding Request Information | Reliability Information | Reference to Next Succeeding Request List | Reference to Request in Same Series |
|---|---|---|---|

FIG.17

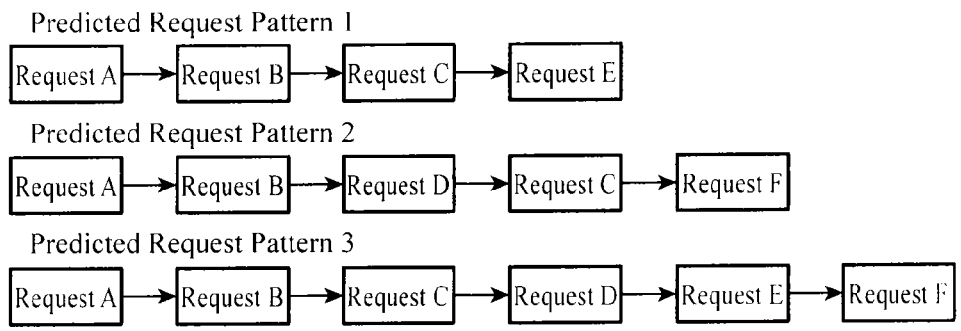

FIG.18 http://[Service Node Domain]/[Service Name]/[API Name]/

FIG.19 http://[Service Node Domain]/[Batch Request Identifier]

FIG.20

["Service Name 1",
 ["API Name 11", JSON(Argument List 111), ..., JSON(Argument List 11M)],
 ...
 ["API Name 1m", JSON(Argument List 1m1), ..., JSON(Argument List 11N)]
]

FIG.21

[Service Request Array Object 1, ..., Service Request Array Object N]

FIG.22

[JSON(return value), JSON(refference arg 1), ..., JSON(refference arg N)]

FIG.23

[Response 1,...,Response N]

FIG.30

Request Issue Time Series List
A→B→C→D→E→F→G→H→I→J→A→K→L→M→N

Request Time Series Analysis Results (1)

| Real Request Information A |
|---|

Request Time Series Analysis Results (2)

| Real Request Information A | Reliability Parameter A1 | Succeeding Request List [ ] |

Request Time Series Analysis Results (3)

| Real Request Information A | Reliability Parameter A1 | Succeeding Request List [B,C,D,E] |

Request Time Series Analysis Results (4)

| Real Request Information A | Reliability Parameter A1 | Succeeding Request List [B,C,D,E] |
| Real Request Information F | | |

Request Time Series Analysis Results (5)

| Real Request Information A | Reliability Parameter A1 | Succeeding Request List [B,C,D,E] |
| Real Request Information F | Reliability Parameter F1 | Succeeding Request List [ ] |

Request Time Series Analysis Results (6)

| Real Request Information A | Reliability Parameter A1 | Succeeding Request List [B,C,D,E] |
| Real Request Information F | Reliability Parameter F1 | Succeeding Request List [G,H,I,J] |

Request Time Series Analysis Results (7)

| Real Request Information A | Reliability Parameter A1 | Succeeding Request List [B,C,D,E] |
| | Reliability Parameter A2 | Succeeding Request List [ ] |
| Real Request Information F | Reliability Parameter F1 | Succeeding Request List [G,H,I,J] |

Request Time Series Analysis Results (8)

| Real Request Information A | Reliability Parameter A1 | Succeeding Request List [B,C,D,E] |
| | Reliability Parameter A2 | Succeeding Request List [K,L,M,N] |
| Real Request Information F | Reliability Parameter F1 | Succeeding Request List [G,H,I,J] |

FIG.32
Request Issue Time Series List
A→B→C→D⇒E⇒A→B→C→D→E
Request Time Series Analysis Results (1)
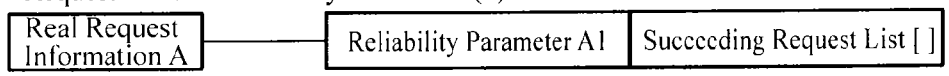
Request Time Series Analysis Results (2)
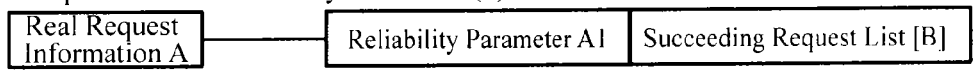
Request Time Series Analysis Results (3)
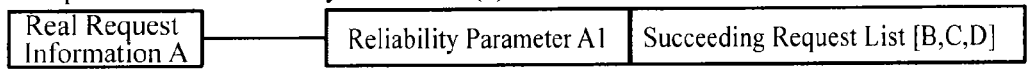
Request Time Series Analysis Results (4)
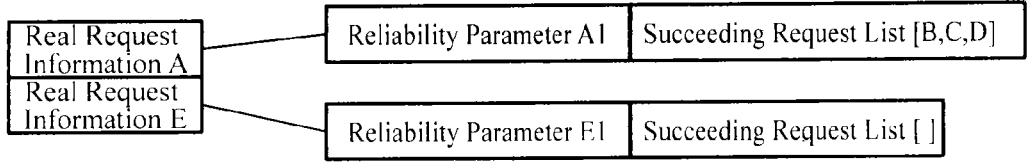
Request Time Series Analysis Results (5)
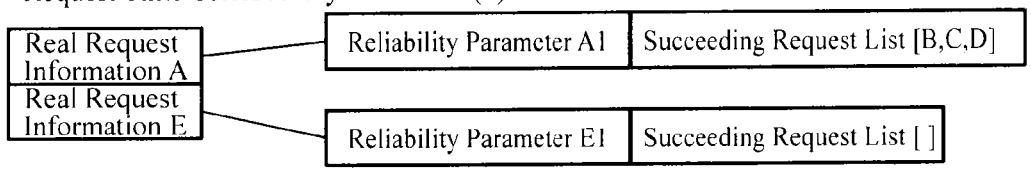
Request Time Series Analysis Results (6)
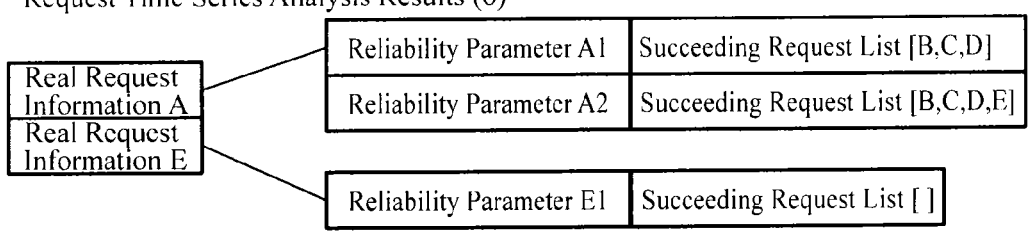

FIG.34

["DeleteResponseEvent", "/srv1/getProps()" ]

FIG.35

["ResetResponseEvent", "/srv1/getProps()", {"time": 567, "flag": true} ]

COMMUNICATION SYSTEM, CLIENT TERMINAL, AND SERVER

FIELD OF THE INVENTION

The present invention relates to a client terminal that issues a request for the performance of a service, a server device that sends processing results of the service corresponding to the performance request to the client terminal, and a communication system consisting of the client terminal and the server device.

BACKGROUND OF THE INVENTION

Conventionally, a method of, when making an application having a GUI (Graphical User Interface) operate on an embedded device, installing a service logic for defining the behavior of the application and a GUI in the same embedded device, and making the service logic and the GUI operate in cooperation with each other has been in the mainstream. However, in an environment in which a PC (Personal Computer) plays a central role, a server client system that uses a network technology, typified by a technology for the Internet, and installs a service logic and a GUI in different nodes on a network has become the) mainstream. Concretely, there can be considered a method installing a service logic in a server device (node), installing a GUI in a client terminal (node), and implementing a cooperative operation by making the client terminal access the server device via a network, thereby constructing one application.

In recent years, the proliferation of a wireless network technology has been providing an environment in which even an embedded device can be always connected to a network. Further, improvements in the processing performance of embedded devices have been progressing. Therefore, it is realistic to implement an application based on a server client system on an embedded device. However, while conventionally, a GUI and a service logic operate in cooperation with each other via inter-process communications in the same node, it is necessary to change the cooperative operation into a one via inter-network communications according to the server client system, and the cooperative process becomes a bottleneck. Therefore, a certain measure, such a measure of reducing the number of times that network communications associated with the cooperative process are performed, is required.

In the following patent reference 1, a communication system in which, for each screen of a GUI displayed on a client terminal, a client terminal predicts a user's operation on the screen, and performs a cooperative process, which is required by the operation before the operation is actually performed, in advance, thereby preventing a communication process from being performed at the time when the operation occurs is disclosed. However, in this communication system, only immediately after displaying a screen of a GUI, a user's operation is predicted, and, when the screen does not make a transition according to a user's operation, no second prediction is not performed. Therefore, for an application which displays the same screen for a long time, the number of times that network communications associated with the cooperative process are performed cannot be sufficiently reduced.

Further, patent reference 2 discloses the following communication system. When a request for the performance of a certain process is issued by a client terminal, a server device predicts a process which may be requested along with the performance request, and performs a process corresponding to the actually issued performance request, and also performs a process which may be requested (referred to as a "predicted request" from here on) along with the performance request. After sending processing results corresponding to the actually issued performance request to the client terminal, the server device sends processing results corresponding to the predicted request back to the client terminal in turn.

Because the client terminal can use processing results corresponding to a predicted request sent thereto from the server device if the prediction by the server device has come true, the client terminal does not have to transmit a new performance request to the server device and can therefore reduce the bottleneck associated with the cooperative process. However, if the number of requests predicted from the actually issued performance request increases when the server device sends processing results corresponding to a predicted request to the client terminal, the communication processing load increases. Further, because the client terminal does not know what request the server device has predicted, before receiving processing results corresponding to a predicted request from the server device, the client terminal may issue the same request as the predicted request. When the client terminal issues the same request as a predicted request, the number of times that communications are performed cannot be reduced. Further, there occurs a necessity for the server device to perform the process corresponding to the same request a number of times.

RELATED ART DOCUMENT

Patent Reference

Patent reference 1: Japanese Unexamined Patent Application Publication No. Hei 7-160462 (paragraph numbers [0017] to [0019])

Patent reference 2: Japanese Unexamined Patent Application Publication No. 2005-228228 (paragraph numbers [0021] and [0037])

SUMMARY OF THE INVENTION

Problems to be Solved by the Invention

Because the conventional communication systems are constructed as above, no second prediction is performed when the screen does not make a transition along with a user's operation in the case of the communication system disclosed in patent reference 1. Therefore, a problem is that for an application that displays the same screen for a long time, the number of times that network communications associated with a cooperative process are performed cannot be sufficiently reduced. Further, a problem with the case of the communication system disclosed in patent reference 2 is that an increase of the number of requests predicted from an actually issued performance request causes an increase in the communication load of processing results corresponding to a predicted request. Further, a problem is that because the client terminal does not known what request the server device predicts, before receiving processing results corresponding to a predicted request from the server device, the client terminal may issue the same request as the predicted request, and, when the client terminal issues the same request as a predicted request, the number of times that communications are performed cannot be reduced.

The present invention is made in order to solve the above-mentioned problems, and it is therefore an object of the present invention to provide a communication system that can sufficiently reduce the number of times that network communications associated with a cooperative process are performed.

Means for Solving the Problem

In accordance with the present invention, there is provided a communication system in which a client terminal includes: a response storage that stores a response sent back thereto by a server device; a performance request issuer that issues a request for the performance of a service; a request pattern generator that, when no response corresponding to the performance request issued by the performance request issuer is stored in the response storage, predicts a request which may be issued following the performance request, and generates a request pattern including the predicted request and the performance request; and a response processor that, when responses corresponding to the performance request and the predicted request included in the request pattern are received from the server device, stores the responses corresponding to the performance request and the predicted request in the response storage and also outputs the response corresponding to the performance request to the performance request issuer.

Advantages of the Invention

Because the communication system in accordance with the present invention includes the request pattern generator that, when no response corresponding to the performance request issued by the performance request issuer is stored in the response storage, predicts a request which may be issued following the performance request, and generates a request pattern including the predicted request and the performance request, and the response processor is constructed in such a way as to, when responses corresponding to the performance request and the predicted request included in the request pattern are received from the server device, store the responses corresponding to the performance request and the predicted request in the response storage and also output the response corresponding to the performance request to the performance request issuer, there is provided an advantage of, when a response corresponding to the performance request is stored in the response storage, eliminating the necessity to transmit the performance request, thereby being able to sufficiently reduce the number of times that network communications associated with the cooperative process are performed.

BRIEF DESCRIPTION OF THE FIGURES

FIG. 8 is an explanatory drawing showing the data structure of a request pattern;

FIG. 9 is an explanatory drawing showing the data structure of an actual request information list;

FIG. 10 is an explanatory drawing showing the data structure of a succeeding request pattern list;

FIG. 17 is an explanatory drawing showing examples of a combination of predicted request patterns;

FIG. 18 is an explanatory drawing showing an example of a description of identification information of an API using a URL;

FIG. 19 is an explanatory drawing showing an example of the description of the identification information of an API using a URL;

FIG. 20 is an explanatory drawing showing a concrete example of expressing a plurality of APIs for a single service, and a plurality of argument lists for each API by using one text format data;

FIG. 21 is an explanatory drawing showing an example of the form of expression of a batch request;

FIG. 22 is an explanatory drawing showing a concrete example of the data expression of a response;

FIG. 23 is an explanatory drawing showing a concrete example of the data expression of a batch response;

FIG. 30 is an explanatory drawing showing an example of generation of request pattern data when the number of predicted request patterns has a maximum of 5;

FIG. 32 is an explanatory drawing showing an example of the generation of request pattern data in the case of using the elapsed time;

FIG. 34 is an explanatory drawing showing an example of a description of a response deletion request event; and FIG. 35 is an explanatory drawing showing an example of the description of a response update request event.

EMBODIMENTS OF THE INVENTION

Hereafter, in order to explain this invention in greater detail, the preferred embodiments of the present invention will be described with reference to the accompanying drawings.

Embodiment 1

Figure 1:
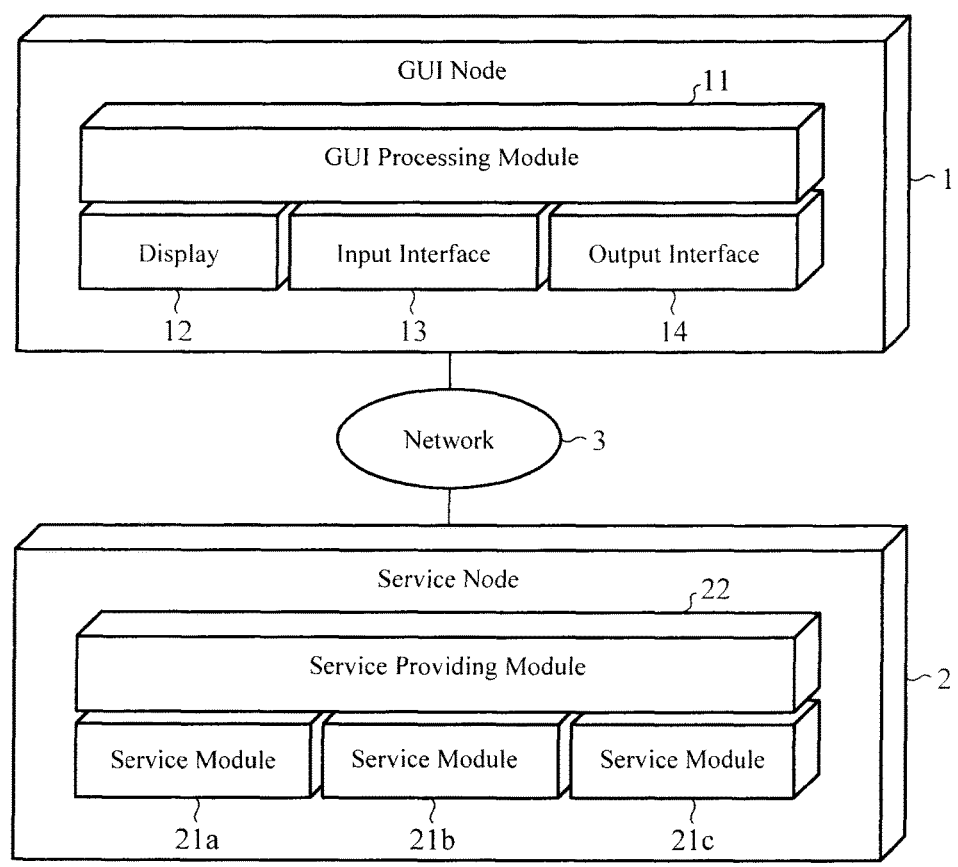
FIG. 1 is a block diagram showing a communication system in accordance with Embodiment 1 of the present invention.

FIG. 1 is a block diagram showing a communication system in accordance with Embodiment 1 of the present invention. Referring to FIG. 1, a GUI node 1 which is a client terminal installs GUIs therein and performs GUI control on the system. More specifically, the GUI node 1 implements a service as the system in cooperation with a service node 2 via a network 3. Concretely, the GUI node 1 issues a request for the performance of a service to the service node 2 via the network 3, and acquires a response which is a result of processing a service corresponding to the performance request from the service node 2 via the network 3. The service node 2 which is a server device performs a logic process on a service which is implemented as the system. Concretely, the service node 2 performs a service corresponding to a performance request issued by the client terminal 1, generates a response which is a result of processing the service, and sends the response to the client terminal 1 via the network 3.

The GUI node 1 is comprised of a GUI processing module 11 that performs all control operations regarding GUIs, a display 12 that displays a GUI, an input interface 13 that accepts an input of, for example, various pieces of information which are reflected in a GUI process, and an output interface 14 that is connected to, for example, voice output equipment including a speaker, and so on. The display 12, the input interface 13, and the output interface 14 do not have to exist within the GUI node 1. The display, the input interface, and the output interface can be arranged distributedly on other nodes connected to the network 3 as needed, respectively. In this case, the GUI node 1 operates in cooperation with the other nodes via the network 3.

Because it is assumed that the GUI node 1 consists of a computer in this Embodiment 1, it is assumed that the GUI processing module 11 is constructed by storing a program showing the details of processing performed by the GUI processing module 11 which will be mentioned below in a memory of the computer in advance, and making a CPU of the computer execute the program stored in the memory. Although the internal structure of the GUI processing module 11 will be mentioned below, each of components of the GUI processing module 11 can be constructed of hardware for exclusive use (e.g., a semiconductor integrated circuit in which a CPU is mounted, or a one chip microcomputer).

The service node 2 is comprised of service modules 21a, 21b, and 21c each of that performs a service corresponding to one of various performance requests, and generates a response which is a result of processing the service, and a service providing module 22 that carries out inter-network communications with the GUI node 1, and performs a process of sending a response corresponding to a performance request transmitted from the GUI node 1 to the GUI node 1, and so on. Although the example in which the three service modules 21a, 21b, and 21c are mounted in the service node 2 is shown in FIG. 1, the number of service modules mounted is not limited to three, and can be less than three, or four or more.

Because it is assumed that the service node 2 consists of a computer in this Embodiment 1, it is assumed that the service providing module 22 and the service modules 21a, 21b, and 21c are constructed by storing a program showing the details of processing performed by the service providing module 22 which will be mentioned below and processing performed by the service modules 21a, 21b, and 21c which will be mentioned below in a memory of the computer in advance, and making a CPU of the computer execute the programs stored in the memory. Although the internal structure of the service providing module 22 will be mentioned below, each of components of the service providing module 22 can be constructed of hardware for exclusive use (e.g., a semiconductor integrated circuit in which a CPU is mounted, or a one chip microcomputer).

Each of the service modules 21a, 21b, and 21c has one or more APIs (Application Program Interfaces) each for calling a function defined by service specifications. As to which one of the APIs is performed at which timing, there are two cases as shown below.

(1) A case in which one of the APIs is performed at which timing obeys the internal control logic of the service node 2.

(2) A case in which one of the APIs is performed at which timing is determined according to an API performance request transmitted from the GUI node 1.

In the case (1), an API which each service module has is performed. In the case (2), the service providing module 22 which receives an API performance request transmitted from the GUI node 1 performs the API. Because the present invention is related to the case (2), no reference is made to the case (1) in this specification.

Figure 2:
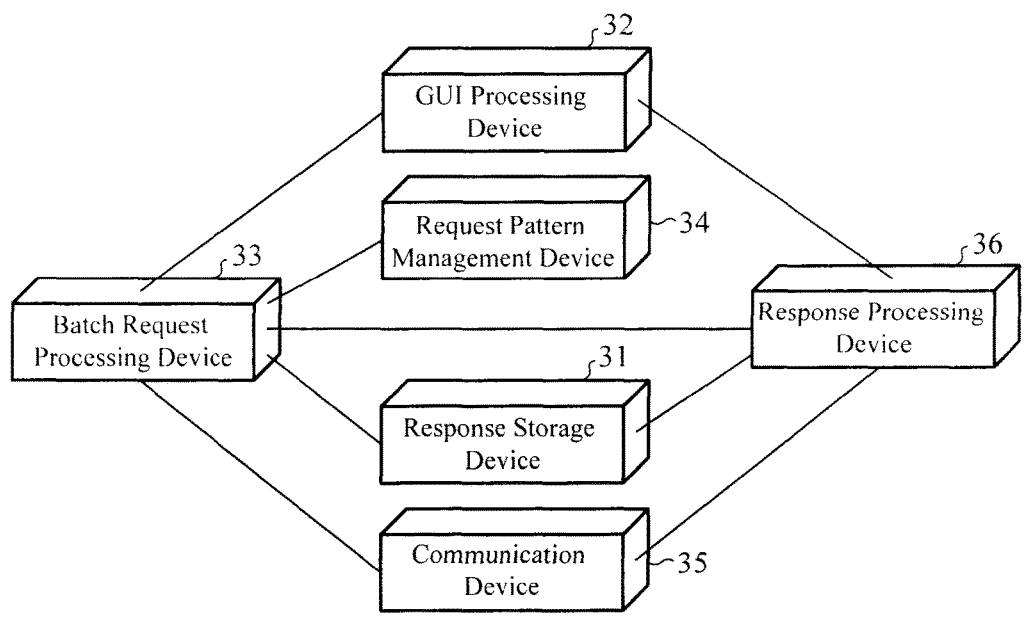
FIG. 2 is a block diagram showing a GUI processing module 11 of a GUI node 1 which is applied to the communication system in accordance with Embodiment 1 of the present invention.

FIG. 2 is a block diagram showing the GUI processing module 11 of the GUI node 1 which is applied to the communication system in accordance with Embodiment 1 of the present invention. Referring to FIG. 2, a response storage device 31 is constructed of a recording medium, such as a RAM or a hard disk, and performs a process of storing a response sent thereto from the service node 2 via the network 3. The response storage device 31 constructs a response storage.

A GUI processing device 32 is constructed of, for example, a semiconductor integrated circuit in which a CPU is mounted, or a one chip microcomputer, and performs a process of issuing an API performance request (request for the performance of a service), acquiring a response corresponding to the API performance request, and displaying the response on the display 12. Although the example of displaying a response corresponding to an API performance request on the display 12 is shown in the embodiment, the response can be outputted by voice. Concretely, the GUI processing device has only to convert the response into voice data, and output the voice data to the output interface 14, and one of various devices connected to the output interface 14 has only to interpret the voice data and output a voice from a speaker or the like. The GUI processing device 32 constructs a performance request issuer.

A batch request processing device 33 is constructed of, for example, a semiconductor integrated circuit in which a CPU is mounted, or a one chip microcomputer, and performs a process of, when a response corresponding to an API performance request issued by the GUI processing device 32 is stored in the response storage device 31, outputting an output command for commanding an output of the response to the GUI processing device 32 to the response processing device 36, whereas when the response corresponding to the API performance request is not stored in the response storage device 31, commanding a request pattern management device 34 to predict a request which may be issued following the API performance request (referred to as a "predicted request" from here on) and generate a request pattern which consists of the API performance request and the predicted request, and outputting the request pattern generated by the request pattern management device 34 to a communication device 35.

The request pattern management device 34 is constructed of, for example, a semiconductor integrated circuit in which a CPU is mounted, or a one chip microcomputer, and has a function of performing a dynamic analysis on a time series pattern of API performance requests and managing the request time series analysis results and performs a process of referring to the request time series analysis results, predicting a request which may be issued following the API performance request outputted from the batch request processing device 33, and generating a request pattern which consists of the API performance request and the predicted request. A request pattern generator is comprised of the batch request processing device 33 and the request pattern management device 34.

The communication device 35 is an interface device to the network 3, and performs a process of transmitting the request pattern, which is generated by the request pattern management device 34 and is outputted from the batch request processing device 33, to the service node 2 via the network 3 and also receiving a response corresponding to the API performance request and transmitted from the service node 2 and a response corresponding to the predicted request and transmitted from the service node 2, the API performance request and the predicted request constructing the request pattern. The communication device 35 constructs a communicator. A response processing device 36 is constructed of, for example, a semiconductor integrated circuit in which a CPU is mounted, or a one chip microcomputer, and performs a process of, when receiving the output command from the batch request processing device 33, outputting the response stored in the response storage device 31 and corresponding to the API performance request to the GUI processing device 32. The response processing device 36 also performs a process of storing the response corresponding to the API performance request and the response corresponding to the predicted request, the responses being received by the communication device 35, in the response storage device 31, and also outputting the response corresponding to the API performance request to the GUI processing device 32. The response processing device 36 constructs a response processor.

Although the example in which each of the response storage device 31, the GUI processing device 32, the batch request processing device 33, the request pattern management device 34, the communication device 35, and the response processing device 36, which are the components of the GUI processing module 11, is constructed of hardware for exclusive use is shown in this embodiment, each of the GUI processing device 32, the batch request processing device 33, the request pattern management device 34, the communication device 35, and the response processing device 36 can be constructed of software. In this case, a program which the details of processing performed by the GUI processing device 32, the batch request processing device 33, the request pattern management device 34, the communication device 35, and the response processing device 36 are described has only to be stored in a memory of the GUI node 1, and a CPU of the GUI node 1 has only to be made to execute the program stored in the memory.

Figure 3:
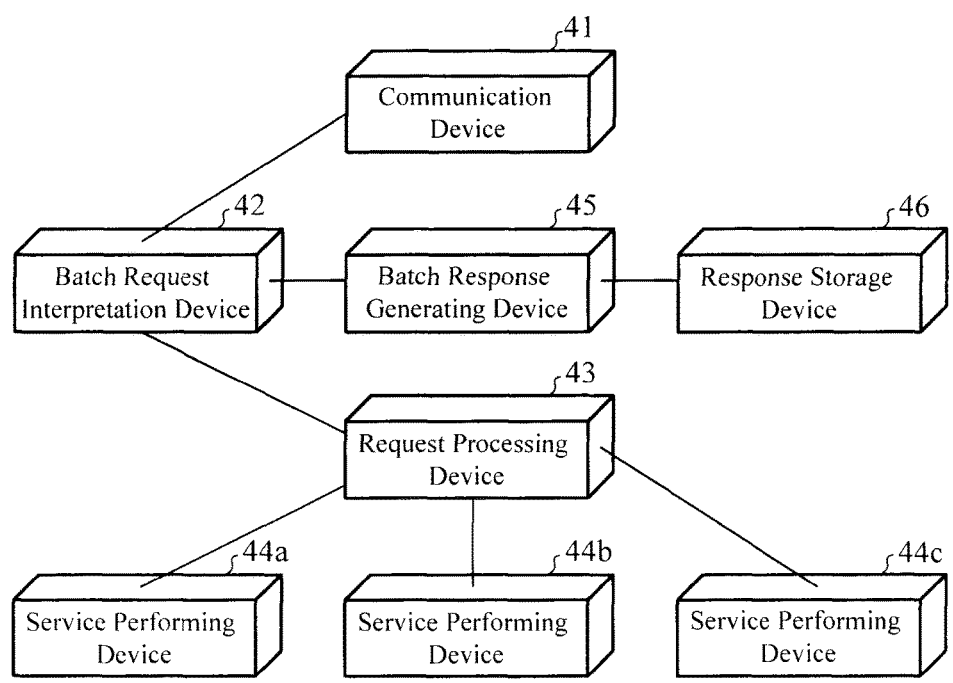
FIG. 3 is a block diagram showing a service providing module 22 of a service node 2 which is applied to the communication system in accordance with Embodiment 1 of the present invention.

FIG. 3 is a block diagram showing the service providing module 22 of the service node 2 which is applied to the communication system in accordance with Embodiment 1 of the present invention. Referring to FIG. 3, a communication device 41 is an interface device to the network 3, and performs a process of receiving the request pattern transmitted from the GUI node 1, and also sending the response corresponding to the API performance request and the response corresponding to the predicted request, the API performance request and the predicted request constructing the request pattern, to the GUI node 1 collectively via the network 3. The communication device 41 constructs a request pattern receiver and a response transmitter.

A batch request interpretation device 42 is constructed of, for example, a semiconductor integrated circuit in which a CPU is mounted, or a one chip microcomputer, and performs a process of decomposing the API performance request and the predicted request which construct the request pattern received by the communication device 41 and outputting each of the requests to a request processing device 43, and also outputting the response outputted from the request processing device 43 and corresponding to each of the requests to a batch response generating device 45 and outputting a batch response generated by the batch response generating device 45 (a response in which the responses respectively corresponding to the requests are combined) to the communication device 41.

The request processing device 43 is constructed of, for example, a semiconductor integrated circuit in which a CPU is mounted, or a one chip microcomputer, and performs a process of, for each request outputted from the batch request interpretation device 42, specifying the service module 21 which performs a service corresponding to the request and providing this request to a service performing device 44 corresponding to the service module 21, and also acquiring a response outputted from the service performing device 44, and outputting the response to the batch request interpretation device 42. For example, when the service module 21 which performs a service corresponding to the request is a service module 21a, the request processing device provides this request to a service performing device 44a, and outputs a response corresponding to the request from the service performing device 44a to the batch request interpretation device 42.

The service performing device 44a is constructed of, for example, a semiconductor integrated circuit in which a CPU is mounted, or a one chip microcomputer, and performs a process of providing the request outputted from the request a processing device 43 to the service module 21a to make this service module perform a service corresponding to the request, and acquiring a response which is a result of processing the service from the service module 21a and outputting the response to the request processing device 43.

A service performing device 44*b* is constructed of, for example, a semiconductor integrated circuit in which a CPU is mounted, or a one chip microcomputer, and performs a process of providing the request outputted from the request processing device 43 to a service module 21*b* to make this service module perform a service corresponding to the request, and acquiring a response which is a result of processing the service from the service module 21*b* and outputting the response to the request processing device 43. A service performing device 44*c* is constructed of, for example, a semiconductor integrated circuit in which a CPU is mounted, or a one chip microcomputer, and performs a process of providing the request outputted from the request processing device 43 to a service module 21*c* to make this service module perform a service corresponding to the request, and acquiring a response which is a result of processing the service from the service module 21*c* and outputting the response to the request processing device 43. A response generator is comprised of the service modules 21*a*, 21*b*, and 21*c* and the service performing devices 44*a*, 44*b*, and 44*c*.

The batch response generating device 45 is constructed of, for example, a semiconductor integrated circuit in which a CPU is mounted, or a one chip microcomputer, and performs a process of, when receiving the response corresponding to each of the requests from the request processing device 43, temporarily storing the response in a response storage device 46, and combining the responses respectively corresponding to all the requests which construct the request pattern to generate a batch response. The response storage device 46 is constructed of a recording medium, such as a RAM or a hard disk, and temporarily stores responses. A response acquiring unit is comprised of the batch request interpretation device 42, the request processing device 43, the batch response generating device 45, and the response storage device 46.

Although the example in which each of the communication device 41, the batch request interpretation device 42, the request processing device 43, the service performing devices 44*a*, 44*b*, and 44*c*, the batch response generating device 45, and the response storage device 46, which are the components of the service providing module 22, is constructed of hardware for exclusive use is shown in this embodiment, each of the communication device 41, the batch request interpretation device 42, the request processing device 43, the service performing devices 44*a*, 44*b*, and 44*c*, and the batch response generating device 45 can be constructed of software. In this case, a program which the details of processing performed by the communication device 41, the batch request interpretation device 42, the request processing device 43, the service performing devices 44*a*, 44*b*, and 44*c*, and the batch response generating device 45 are described has only to be stored in a memory of the service node 2, and a CPU of the service node 2 has only to be made to execute the program stored in the memory.

Next, the operation of the communication system will be explained. An API performance request from the GUI node 1 to the service node 2 is transferred via the network 3. When receiving the API performance request via the network 3, the service node 2 performs a specified API associated with a service specified by the API performance request and sends, as a response, a result of the performance of the API back to the GUI node 1 via the network 3. By making the GUI node 1 and the service node 2 operate in cooperation with each other as mentioned above, the system provides various services which the service node 2 has for users as a whole.

Hereafter, using a concrete example, an explanation will be made as to being able to implement services by making the GUI node and the service node operate in cooperation with each other. In this embodiment, it is assumed that the communication system displays an image of a map of an area surrounding a current position on the display 12. In this case, a process of acquiring coordinate information about the current position at regular intervals (current position acquiring process), a process of generating a map image with a specified scale on the basis of the coordinate information about the current position (map generating process), and a process of displaying the map image generated in the map generating process on the display 12 (map display process) are needed.

At this time, the current position acquiring process can be treated as a service of providing information regarding the current position. Similarly, the map generating process can be treated as a service of providing a map of an area surrounding the current position on the basis of the position information. More specifically, the current position acquiring process and the map generating process are the ones performed by the service node 2. On the other hand, because the map display process is the one of processing the results of the current position acquiring process and the map generating process, and displaying the processed results on the display 12, the map display process is the one performed by the GUI node 1.

Next, APIs which the service node 2 should provide for the GUI node 1 will be explained. Because the system has only to display an image of a map of an area surrounding the current position on the display 12 as a whole, APIs which the service node 2 should provide for the GUI node 1 include only an API for providing a map of an area surrounding the current position. Therefore, when receiving the API for providing a map of an area surrounding the current position from the GUI node 1, the service node 2 has only to be able to perform the map generating process by using, as a parameter, the current position information which the service node acquires by performing the current position acquiring process, and send map information which is a result of the map generating process to the GUI node 1 which is the source of the request as a result of processing the API for providing a map of an area surrounding the current position.

At the GUI node 1, the GUI processing module 11 performs a process of issuing an API performance request for the performance of the API for providing a map of an area surrounding the current position to the service node 2 at fixed intervals, and processing map information, as a response to the API performance request, acquired from the service node 2 into data which can be displayed on the display 12 so as to display a map image on the display 12. As a result, a service which is requested as the system can be provided for system users.

Before a concrete processing sequence between the GUI node 1 and the service node 2 is explained, GUI descriptive data which the GUI node 1 handles will be explained. HTML (Hyper Text Markup Language) is provided as an example of the GUI descriptive data describing GUIs which are implemented by the GUI node 1. HTML is a standard description language in which the structure of a document, a display method, etc. can be described, and indicates data described in the description language. Further, HTML can use CSS (Cascade Style Sheet) describing a setting of the external appearance of a document described in HTML, and JavaScript (registered trademark, and this description will be omitted hereafter) describing control of objects, etc. in a document described in HTML. As mentioned above, HTML is a language which originally describes the structure of a document, while its functions have been expanded and HTML has been often used also as a language used for the development of applications and GUIs in recent years.

In general, a GUI can be expressed by data with the GUI being divided into Model for defining objects and data in the GUI, View for defining the external appearance of the GUI, and Control for defining the control of Model and View. When a GUI is described by using HTML, CSS, and JavaScript, the GUI processing module 11 can be treated as a browser. By using HTML as the GUI descriptive data, the arrangement and the external appearance of each object required for a GUI, such as a text or a button displayed on the screen, can be described in HTML. Further, control corresponding to an event, such as a user operation on each object or a timer, and communications control using HTTP (Hyper Text Transfer Protocol) or the like can be described by using JavaScript.

By treating the GUI node 1 as a client terminal and the service node 2 as a server device, the process of issuing an API performance request can be described as an HTTP request to the service node 2 by using JavaScript. Further, the GUI processing module 11 can transmit the API performance request from the GUI node 1 to the service node 2 by performing the JavaScript, and the GUI node can receive processing results corresponding to the API performance request as an HTTP response.

Although an explanation will be made hereinafter by assuming that this embodiment uses a method of using HTML, CSS, and JavaScript for the GUI descriptive data, and using HTTP as the communications protocol between the GUI node 1 and the service node 2, the present invention is not limited to the method, and GUI descriptive data which can describe information for implementing a GUI in the GUI node 1 and which can describe communications with the service node 2 can be alternatively used.

Although the GUI descriptive data can be held by the GUI node 1, a method of making the service node 2 hold the GUI descriptive data and enabling the GUI node 1 to acquire the GUI descriptive data from the service node 2 as needed can be alternatively used. In this case, it is assumed that a request for the acquisition of the GUI descriptive data is handled as a request different from the above-mentioned API performance request. It is assumed hereafter that request described below indicates API performance request unless otherwise specified. As an alternative, a method of making another node (e.g., a GUI data server that stores the GUI descriptive data and provides the GUI descriptive data in response to a request) connected to the network 3 store the GUI descriptive data, and enabling the GUI node 1 to acquire the GUI descriptive data from the other node as needed can be used.

Figure 4:
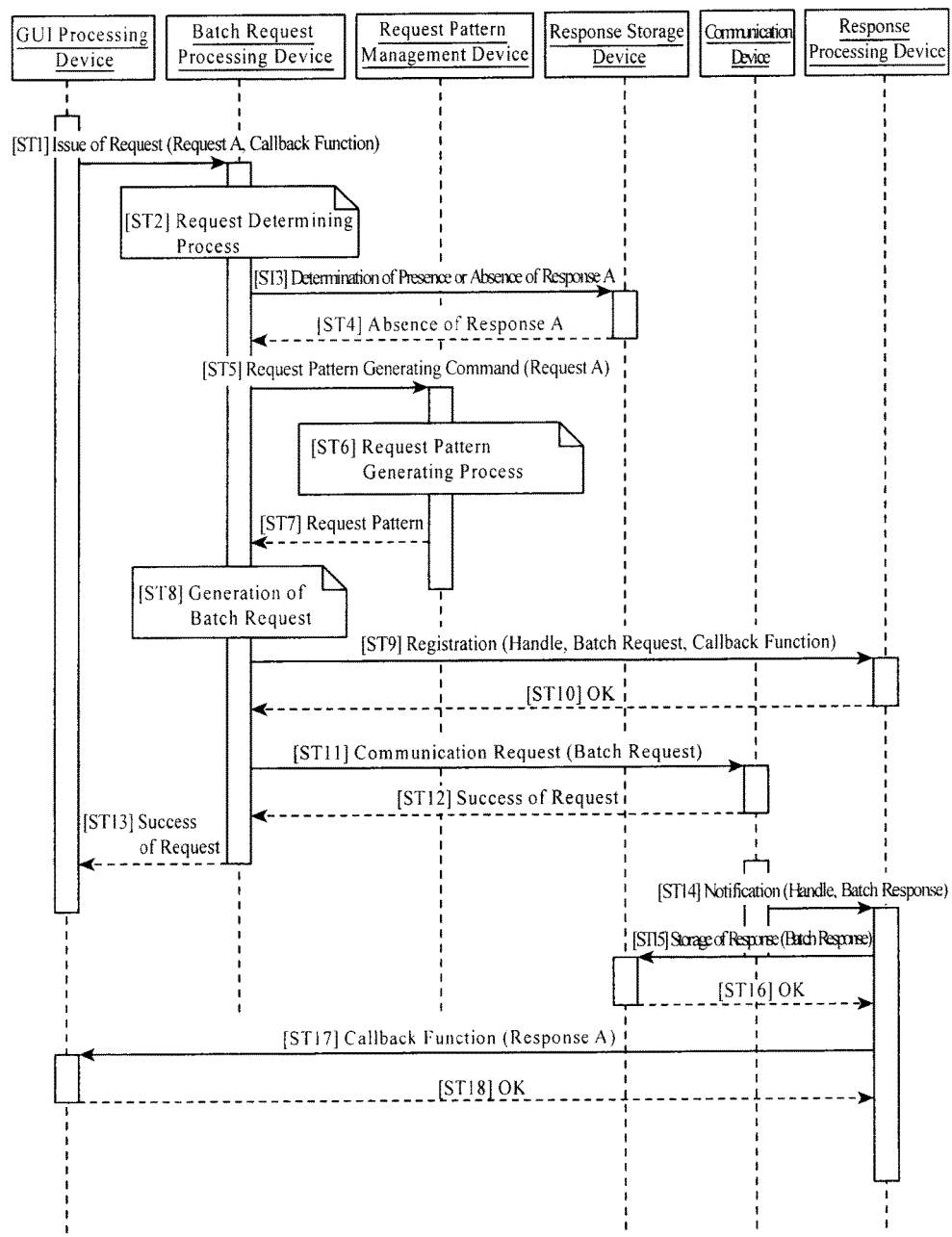
FIG. 4 is a sequence diagram showing a processing sequence of a GUI processing device 32 in the GUI node 1 (when a response corresponding to an API performance request is not stored)
Figure 5:
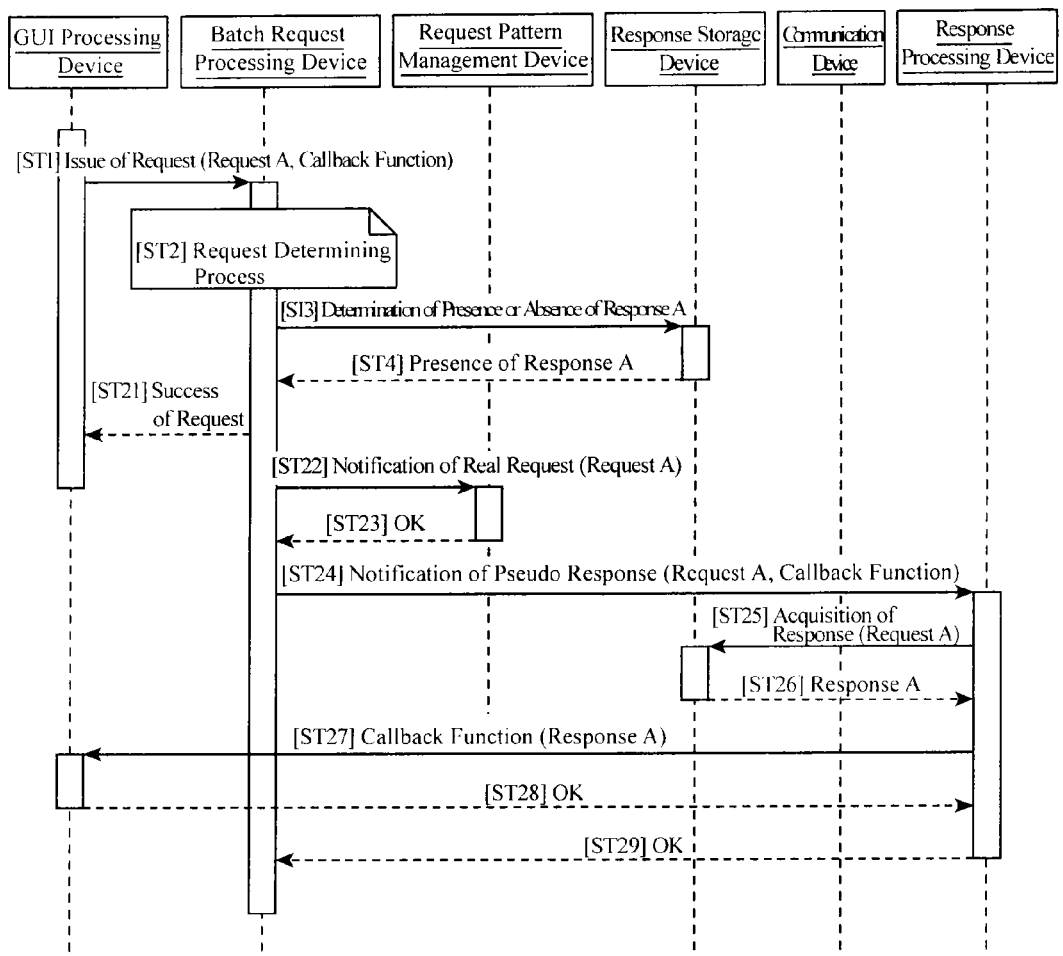
FIG. 5 is a sequence diagram showing a processing sequence of the GUI processing device 32 in the GUI node 1 (when a response corresponding to an API performance request is stored)

Next, the details of processing at the time when the GUI node 1 issues an API performance request and acquires a result of processing the API performance request will be explained. FIGS. 4 and 5 are sequence diagrams each showing a processing sequence of the GUI processing device 32 at the GUI node 1. FIG. 4 shows a processing sequence when the response storage device 31 does not store any response corresponding to the API performance request, and FIG. 5 shows a processing sequence when the response storage device 31 stores a response corresponding to the API performance request.

First, the GUI processing device 32 issues an API performance request (step ST1). It is assumed that as this API performance request, together with a request including information regarding an API which is the target for performance (shown as "request A" in FIGS. 4 and 5), a callback function which is to be performed when the response processing device 36 acquires a response corresponding to the request can be specified. As a result, the GUI processing device 32 can start the processing by using, as a trigger, the reception of a response corresponding to the API performance request by the GUI node 1. When only one service node 2 which can communicate exists, it is not necessary to provide, as a parameter, service node information showing the transmission destination of the API performance request. When two or more service nodes 2 which can communicate exist or even when only one service node 2 which can communicate exists, the service node information can be provided explicitly as a parameter. In this case, the service node information can be expressed as a URL.

Figure 6:
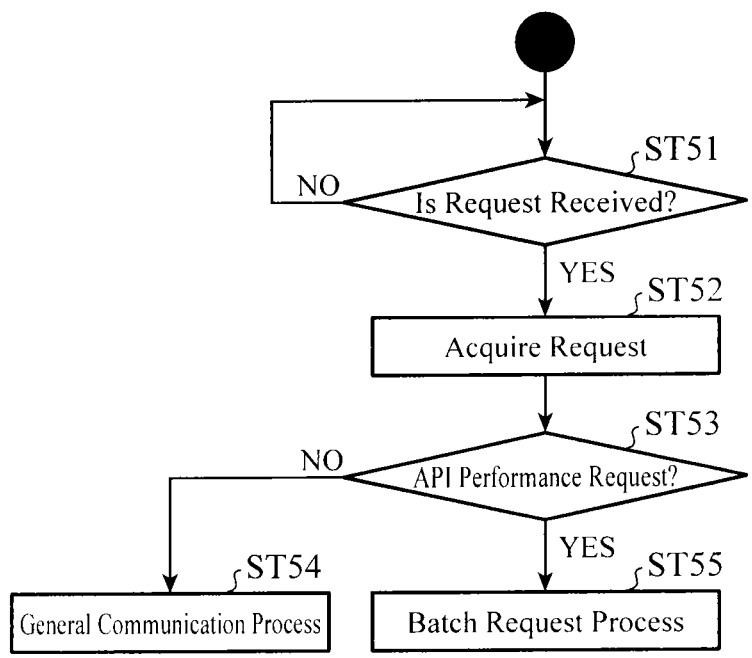
FIG. 6 is a flow chart showing a process of determining whether a request is an API performance request or a request other than API performance requests, which is performed by a batch request processing device 33.

When receiving the request from the GUI processing device 32, the batch request processing device 33 determines whether the request is an API performance request or a request other than API performance requests (step ST2). FIG. 6 is a flow chart showing the process of determining whether the request is an API performance request or a request other than API performance requests, which is performed by the batch request processing device 33. The batch request processing device 33 stands by until a request is outputted from the GUI processing device 32, and, when a request is outputted from the GUI processing device 32 (step ST51), acquires the request (step ST52).

When acquiring the request, the batch request processing device 33 determines the type of the request and also determines whether the request is an API performance request or a request other than API performance requests (step ST53). When the request is a request other than API performance requests, the batch request processing device 33 outputs a command for transmitting the request to the request destination to the communication device 35 without changing the description of the request (step ST54). In contrast, when the request is an API performance request, the batch request processing device changes the description of the request and outputs a command for transmitting a request pattern having the changed description (request pattern which consists of the API performance request and a predicted request) to the request destination to the communication device 35 (step ST55). Hereafter, an example in which the request outputted from the GUI processing device 32 is an API performance request is shown.

When determining that the request outputted from the GUI processing device 32 is an API performance request, the batch request processing device 33 checks whether or not a response corresponding to the API performance request (in FIGS. 4 and 5, the response is shown as "response A") is stored in the response storage device 31 (step ST3), and acquires a result of the check (presence or absence of the response A) (step ST4). Hereafter, a case in which the response A corresponding to the API performance request is not stored in the response storage device 31 will be explained. A case in which the response A corresponding to the API performance request is stored is the response storage device 31 will be mentioned below.

When the response A corresponding to the API performance request is not stored in the response storage device 31, the batch request processing device 33 needs to transmit the API performance request to the service node 2 to acquire the response A corresponding to the API performance request from the service node 2. Therefore, the batch request processing device commands the request pattern management device 34 to predict a request which may be issued following the API performance request (referred to as a "predicted request" from here on) and generate a request pattern which consists of the API performance request (actual request) and the predicted request (step ST5). The request pattern is a request group which consists of the API performance request (actual request) and one or more predicted requests.

When receiving the command for generating a request pattern from the batch request processing device 33, the request pattern management device 34 refers to the results of a dynamic analysis on the time series pattern of API performance requests which were issued in the past, predicts an API performance request A having the highest possibility of being issued following the API performance request (actual request) outputted from the batch request processing device 33 from among the API performance requests which were issued in the past, and determines the predicted API performance request as a predicted request. The request pattern management device 34 further predicts an API performance request A having the highest possibility of being issued following the predicted request from among the API performance requests which were issued in the past, and determines the predicted API performance request as a predicted request. Although details will be mentioned below, this process of determining a predicted request is repeatedly performed one or more times. After determining one or more predicted requests, the request pattern management device 34 generates a request pattern (API performance request (actual request)+predicted request+predicted request+ . . . ) which consists of the API performance request (actual request) and the one or more predicted requests (step ST6), and outputs the request pattern to the batch request processing device 33 (step ST7).

When receiving the request pattern from the request pattern management device 34, the batch request processing device 33 generates a batch request including the request pattern (step ST8). The batch request processing device 33 also registers handle information for transmitting the batch request to the service node 2, the batch request, and the callback function corresponding to the request A which is the API performance request (actual request) in the response processing device 36 (steps ST9 and ST10). The batch request processing device 33 further outputs a command for transmitting the batch request to the service node 2 to the communication device 35 (step ST11), and, when receiving an acknowledgment of receipt of the command for transmitting the batch request from the communication device 35 (step ST12), notifies the GUI processing device 32 that the request issuing process is completed (step ST13).

When receiving the command for transmitting the batch request from the batch request processing device 33, the communication device 35 transmits the batch request to the service node 2 via the network 3. Further, when receiving a batch response (a response to the API performance request (actual request)+a response to the predicted request+a response to the predicted request+ . . . ) respectively corresponding to the requests (the API performance request (actual request)+the predicted request+the predicted request+ . . . ) which construct the request pattern included in the batch request from the service node 2, the communication device 35 outputs the batch response and a communication handle to the response processing device 36 (step ST14). The details of concrete processing performed by the service node 2 will be mentioned below.

When receiving the batch response and the communication handle from the communication device 35, the response processing device 36 stores the response to the API performance request (actual request) and the response to each of the one or more predicted requests, which are included in the batch response, in the response storage device 31 (steps ST15 and ST16). The response processing device 36 also extracts the callback function corresponding to the request A which is the API performance request (actual request) from callback functions previously registered by using the communication handle as a key, and performs the callback function to notify the response A corresponding to the request A to the GUI processing device 32 (steps ST17 and ST18). When receiving the response A corresponding to the request A, the GUI processing device 32 displays the response A on the display 12, for example.

Next, the case in which the response A corresponding to the API performance request is stored in the response storage device 31 will be explained. Because the details of the processes including up to steps ST1 to ST4 are the same as those in the case in which the response A corresponding to the API performance request is not stored, the explanation of the processes will be omitted hereafter.

Because it is not necessary to transmit the request A which is an API performance request to the service node 2 when the response A corresponding to the API performance request is stored in the response storage device 31, the batch request processing device 33 notifies the GUI processing device 32 that the request issuing process is completed (step ST21 of FIG. 5). The batch request processing device 33 also notifies the request pattern management device 34 that the request A which is an API performance request is issued (steps ST22 and ST23). When receiving a notification showing that the request A which is an API performance request is issued, the request pattern management device 34 updates the results of the dynamic analysis on the time series pattern of API performance requests which were issued in the past.

The batch request processing device 33 further outputs an output command for commanding an output of the response A corresponding to the request A, which is stored in the response storage device 31, to the GUI processing device 32 to the response processing device 36 in order to handle, as a response transmitted from the service node 2, the response A corresponding to the request A which is an API performance request (step ST24). In FIG. 5, the command outputted to the response processing device 36 is shown as "pseudo response notification", and the request A which is an API performance request and the callback function corresponding to the request A are included in this pseudo response notification.

When receiving the pseudo response notification from the batch request processing device 33, the response processing device 36 acquires the response A corresponding to the request A from the response storage device 31 by using, as a key, the request A included in the pseudo response notification (steps ST25 and ST26). Further, by performing the callback function included in the pseudo response notification, the response processing device 36 notifies the response A corresponding to the request A to the GUI processing device 32 (steps ST27 and ST28), and also notifies the batch request processing device 33 that the response A is notified to the GUI processing device 32 (step ST29).

By performing the processing at the GUI node 1 in the above-mentioned way, the system can continue performing the processing without issuing a request for which a response has been received to the service node 2. Further, although the above-mentioned explanation is made on the assumption that a thread which receives the request and a thread which receives the response perform the series of request and response processes in different asynchronous processes, these processes are not necessarily asynchronous ones. The thread which performs the request process can perform a synchronous process of standing by until receiving the response.

Figure 7:
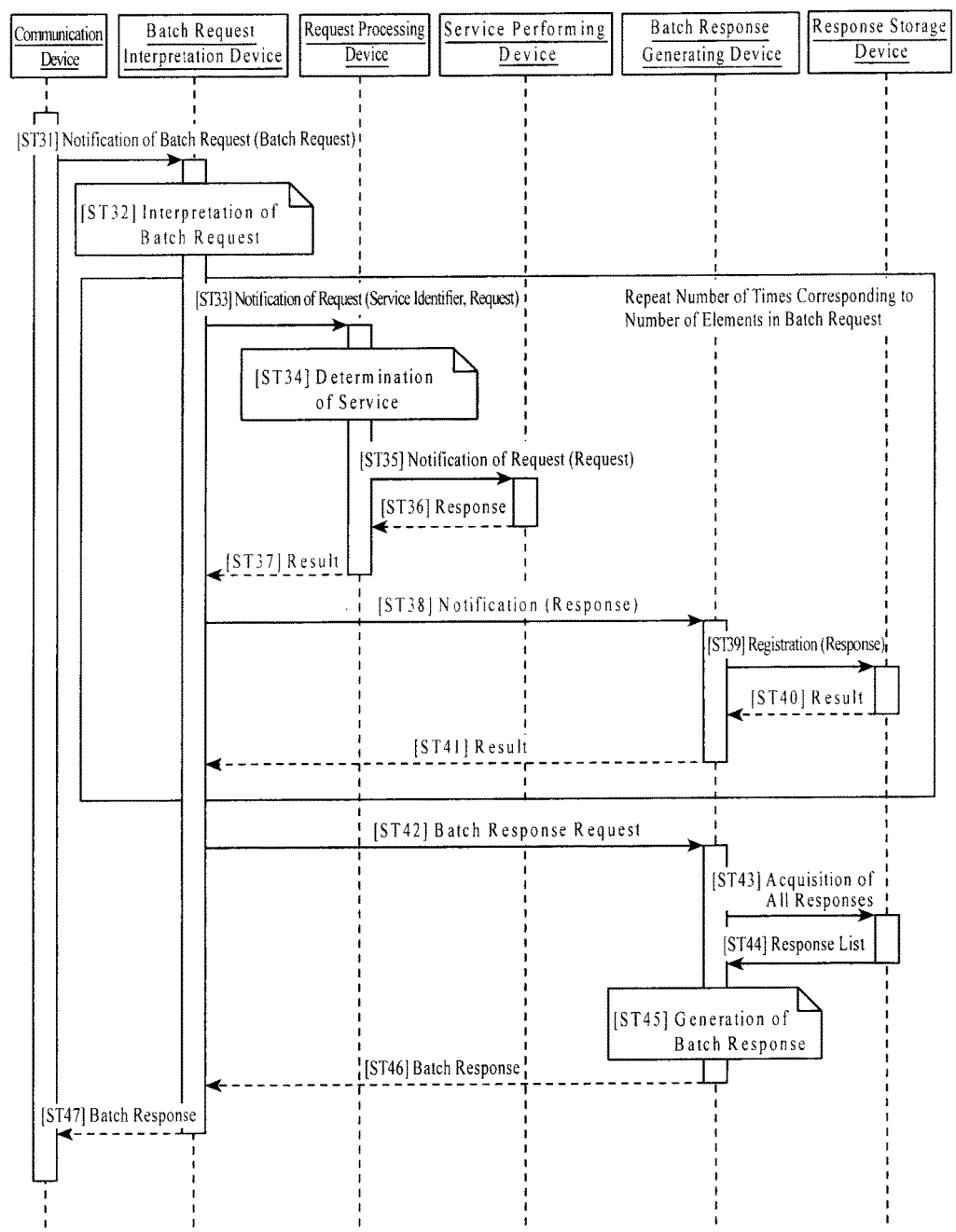
FIG. 7 is a sequence diagram showing a processing sequence of a service providing module 22 in the service node 2.

Next, the details of processing performed by the service providing module 22 in the service node 2 will be explained concretely. FIG. 7 is a sequence diagram showing a processing sequence of the service providing module 22 in the service node 2.

When a batch request is transmitted from the GUI node 1 because the response A corresponding to the request A which is an API performance request is not stored in the response storage device 31, the communication device 41 of the service providing module 22 receives the batch request and outputs the batch request to the batch request interpretation device 42 (step ST31).

When receiving the batch request from the communication device 41, the batch request interpretation device 42 decomposes the batch request into the requests (API performance request (actual request)+predicted request+predicted request+ . . . ) which construct the request pattern included in the batch request, and extracts the service identifier of the service which is the request destination of each of the requests (step ST32). The batch request interpretation device 42 outputs a pair of each of the requests and the service identifier to the request processing device 43 in order (step ST33). The order in which the pairs each having a request and a service identifier are outputted is the order in which the requests are arranged in the request pattern, and, after outputting the pair of the API performance request (actual request) and the service identifier first, the batch request interpretation device outputs the pair of the predicted request arranged next to the API performance request (actual request), and the service identifier. After that, the batch request interpretation device outputs pairs of all predicted requests and the service identifiers in order.

Every time when receiving a pair of a request and a service identifier from the batch request interpretation device 42, the request processing device 43 refers to the service identifier to specify the service module 21 which performs the service corresponding to the request (step ST34), and outputs the request to the service performing device 44 corresponding to the service module 21 (step ST35). For example, when the service module which performs the service corresponding to the request is the service module 21a, the request processing device outputs the request to the service performing device 44a, when the service module which performs the service corresponding to the request is the service module 21b, the request processing device outputs the request to the service performing device 44b, and, when the service module which performs the service corresponding to the request is the service module 21c, the request processing device outputs the request to the service performing device 44b.

When receiving the request from the request processing device 43, each of the service performing devices 44a, 44b, and 44c provides the request to the corresponding one of the service modules 21a, 21b, and 21c to make the service module perform the service corresponding to the request, and acquires a response which is a result of processing the service from the corresponding one of the service modules 21a, 21b, and 21c and outputs the response to the request processing device 43 (step ST36). When receiving the response corresponding to the request from one of the service performing devices 44a, 44b, and 44c, the request processing device 43 outputs the response to the batch request interpretation device 42 (step ST37).

When receiving the response corresponding to the request from the request processing device 43, the batch request interpretation device 42 outputs the response to the batch response generating device 45 (step ST38). When receiving the response corresponding to the request from the request processing device 43, the batch response generating device 45 registers the response in the response storage device 46 (step ST39). The response storage device 46 stores the response corresponding to the request in a storage area in a list form in which the registration order is maintained (steps ST40 and ST41). The processes of steps ST33 to ST41 are repeatedly carried out the number of times corresponding to the number of requests which construct the request pattern.

When the processes of steps ST33 to ST41 are completed, the batch request interpretation device 42 outputs a request for the generation of a batch response to the batch response generating device 45 (step ST42). When receiving the request for the generation of a batch response from the batch request interpretation device 42, the batch response generating device 45 acquires the response corresponding to each of the requests already registered in the response storage device 46 (steps ST43 and ST44), and combines these responses to generate a batch response (step ST45). In the process of combining the plurality of responses, by referring to the response list in which the registration order is maintained, the responses corresponding to the requests are combined in the same order as that in which the requests are arranged in the request pattern. As a result, the response at the head of the batch response is the one corresponding to the request A which is an API performance request, and the response at the second position of the batch response is the one corresponding to the predicted request arranged next to the request A.

After generating the batch response, the batch response generating device 45 outputs the batch response to the batch request interpretation device 42 (step ST46). When receiving the batch response from the batch response generating device 45, the batch request interpretation device 42 outputs the batch response to the communication device 41 (step ST47). When receiving the batch response from the batch request interpretation device 42, the communication device 41 sends the batch response back to the GUI node 1 via the network 3.

Although a concrete processing sequence between the GUI node 1 and the service node 2 is clear from the above description, the details of processing performed by each component at the GUI node 1 and so on will be explained more concretely.

[Explanation of the Request Pattern Management Device 34]

FIG. 8 is an explanatory drawing showing the data structure of the request pattern. First, in the results of the dynamic analysis on the time series pattern of API performance requests, the time series pattern of API performance requests issued by the GUI processing device 32 and the frequency with which each API performance request is issued are recorded.

Referring to FIG. 8, the data structure of elements of the request time series analysis results consists of "actual request information" and a "succeeding pattern list", and the data structure of elements of the succeeding pattern list consists of a "reliability parameter" and a "succeeding pattern."

The "actual request information" is a region in which information regarding API performance requests (refers to as "actual requests" from here on) issued by the GUI processing device 32 is stored, and the "succeeding pattern list" consists of a list having, as its elements, one or more patterns each succeeding an actual request stored in the actual request information. The "succeeding pattern list" has a list structure, and the predicted requests can be managed in such a way that they are sorted in descending order of probability of succeeding an actual request. The data structure of the elements of the succeeding pattern list shows an example of the elements of the succeeding pattern list, and the "reliability parameter" stores information showing the reliability of the pattern and the "succeeding pattern" is a request list in which the pieces of succeeding request information are arranged in time-series order.

As the "reliability parameter", the number of times (issue count) that it is confirmed that the pattern has been actually issued, or the like is assumed. In addition, information about the latest date and time at which the pattern was actually issued, the number of times that the prediction has succeeded or failed as each predicted request, or the like, and information available as a parameter when determining each predicted request can be stored together. In the "succeeding pattern", the pieces of succeeding request information are listed in time-series order. The description of each request which should be described in each element of the "succeeding pattern" can have the same data structure as that of the "actual request information." In addition, a list of the values of arguments which are provided at run time, and information showing what reliability each element of the predicted request list has can be stored together. As a concrete example of the information, the number of times that the prediction for each request has succeeded or failed, or the like can be considered.

Next, a concrete example of the request time series analysis results in another form of expression will be explained. FIG. 9 is an explanatory drawing showing the data structure of an actual request information list, and the data structure shown in FIG. 9 corresponds to the data structure of the request pattern shown in FIG. 8. "Real request information" is a region which stores information showing a request which has been actually issued, and means that the request is the first one in the request pattern. "Reference to succeeding pattern management data" is a region, behind the actual request information, which refers to data for managing results of an analysis regarding a request actually issued. In this reference, request pattern list data for succession are referred to. By tracing this reference, information about a request which was issued in the past following the actual request can be referred to. "Reference to next actual request" is a region which, when there are other actual request information list data, can refer to this actual request information list data. A case in which this region is NULL means that no more actual request information list data exist.

FIG. 10 is an explanatory drawing showing the data structure of a succeeding request pattern list, and the data structure shown in FIG. 10 corresponds to the data structure of the elements of the succeeding pattern list shown in FIG. 8. "Succeeding request information" is a region which stores information about a request which is predicted to be issued the next time. "Reliability information" is a region which stores information which is a measure showing how much reliable the predicted request is. "Reference to next succeeding request list" is a region which refers to data for managing the results of the analysis regarding a request actually issued following the succeeding request. In this reference, the request pattern list data for succession are referred to. A case in which this region is NULL means that no more request issued succeedingly exists. "Reference to request in the same series" is a region which refers to succeeding request pattern list data regarding a request different from the succeeding request and issued in the same time-series order. A case in which this region is NULL means that no more request issued in the same sequence exists.

Figure 11:
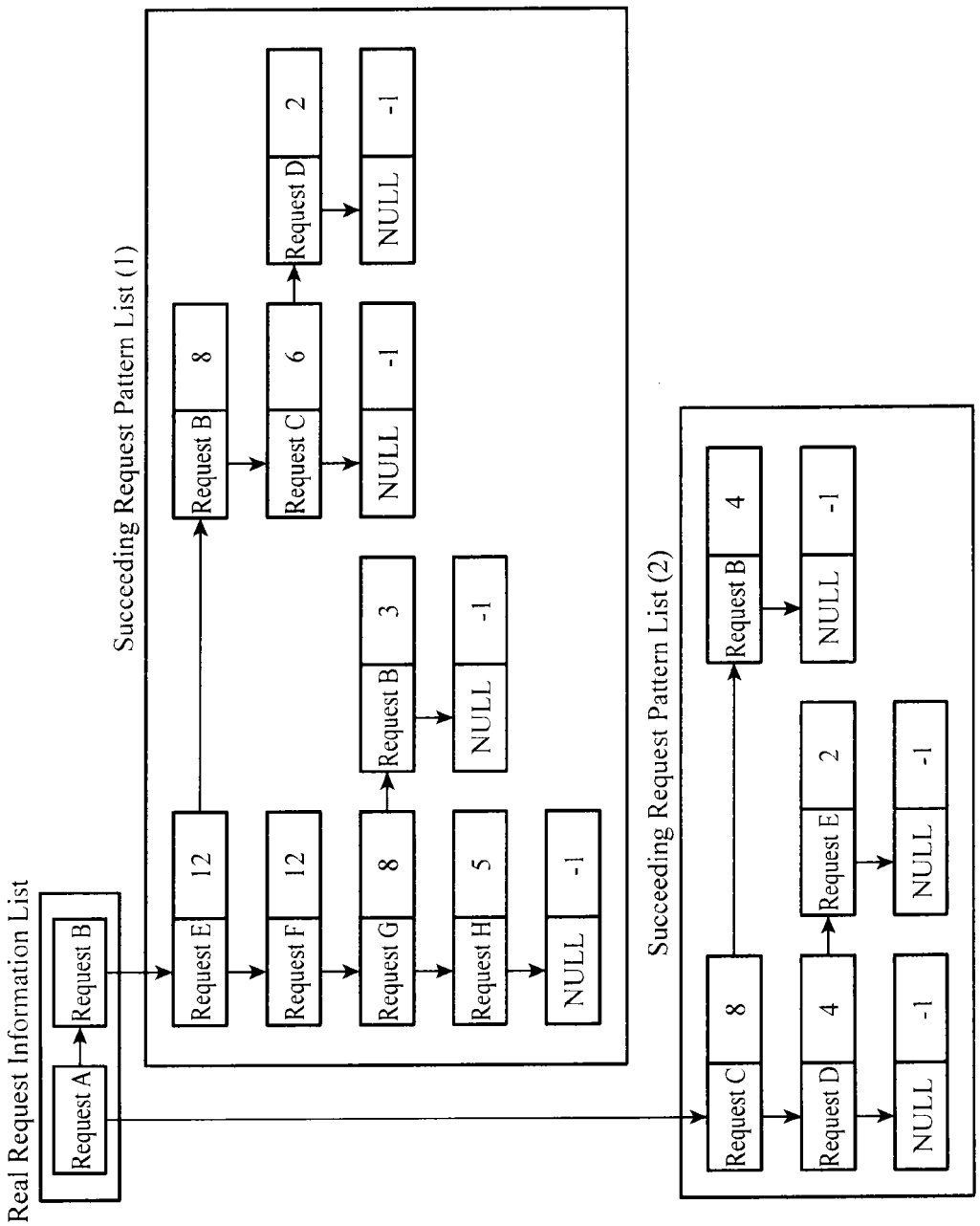
FIG. 11 is an explanatory drawing showing an example of a concrete request pattern using the actual request information list data structure and the succeeding request pattern list data structure.

FIG. 11 is an explanatory drawing showing an example of a concrete request pattern using the actual request information list data structure and the succeeding request pattern list data structure. A "actual request information list" constructs list data in which actual request information list data are defined as elements, and is list data in which requests each of which is the head of a request pattern are listed. The example of FIG. 11 shows that a request A and a request B are the ones which are included in the requests actually issued in the past, and each of which has been issued as the head. What is referred to by the reference to succeeding request pattern management data of each element of the "actual request information list" constructs tree data in which succeeding request pattern list data are defined as elements, and is tree data for managing a request succeeding the actual request. An element of the succeeding request pattern list which is referred to directly by an element of the actual request information list, and an element which can be reached by recursively tracing the "reference to succeeding request in the same series" of the element have information regarding a request issued immediately after the actual request in the "succeeding request information."

For example, FIG. 11 means that the following two types of requests: a request C corresponding to an element directly referred to by the actual request A and the request B which can be reached by recursively tracing the "reference to succeeding request in the same series" of an element corresponding to the request C succeed the request A. Similarly, a request corresponding to an element which is referred to by the "reference to next succeeding request list" of an element of the succeeding request pattern list and all requests corresponding to elements that can be referred to by recursively tracing the "reference to succeeding request in the same series" of the element have information regarding a request which have succeeded a request in the request pattern in the "succeeding request information." For example, FIG. 11 means that when the request C issued immediately after the actual request A is considered as a request for reference, requests which have succeeded the request C are requests D and E.

The figure means that by repeating the above-mentioned processing, five possible succeeding request patterns as mentioned blow are provided when the request A is actually issued.

A
A→C
A→C→D
A→C→E
A→B

Although one piece of reliability information is set up for each request pattern in the case of the data structure shown in FIG. 8, the data structure shown in FIGS. 9 and 10 differs from the data structure shown in FIG. 8 in that reliability information is set up for each succeeding request. More specifically, while reliability regarding an issue of a request pattern is set up as reliability information in the data structure shown in FIG. 8, the data structure shown in FIGS. 9 and 10 differs from the data structure shown in FIG. 8 in that reliability for each request predicted to be issued the next time is set up, as reliability information, for a certain request.

Hereafter, a concrete example in which when managing a request pattern by using the data structure shown in FIGS. 9 and 10, the request pattern management device 34 updates the request pattern dynamically will be explained. The time that the request pattern management device 34 gets to know a request actually issued by the GUI node 1 is the one that the command for generating a request pattern is outputted by the batch request processing device 33 (step ST5 of FIG. 4) or the one of receiving an actual request as a parameter in the notification of the actual request (step ST22 of FIG. 5). The following explanation will be made by assuming that "reference to request to be processed" showing from which position in the entire request pattern the notified request should be searched for is inputted to the request pattern management device 34 at that time.

Figure 12:
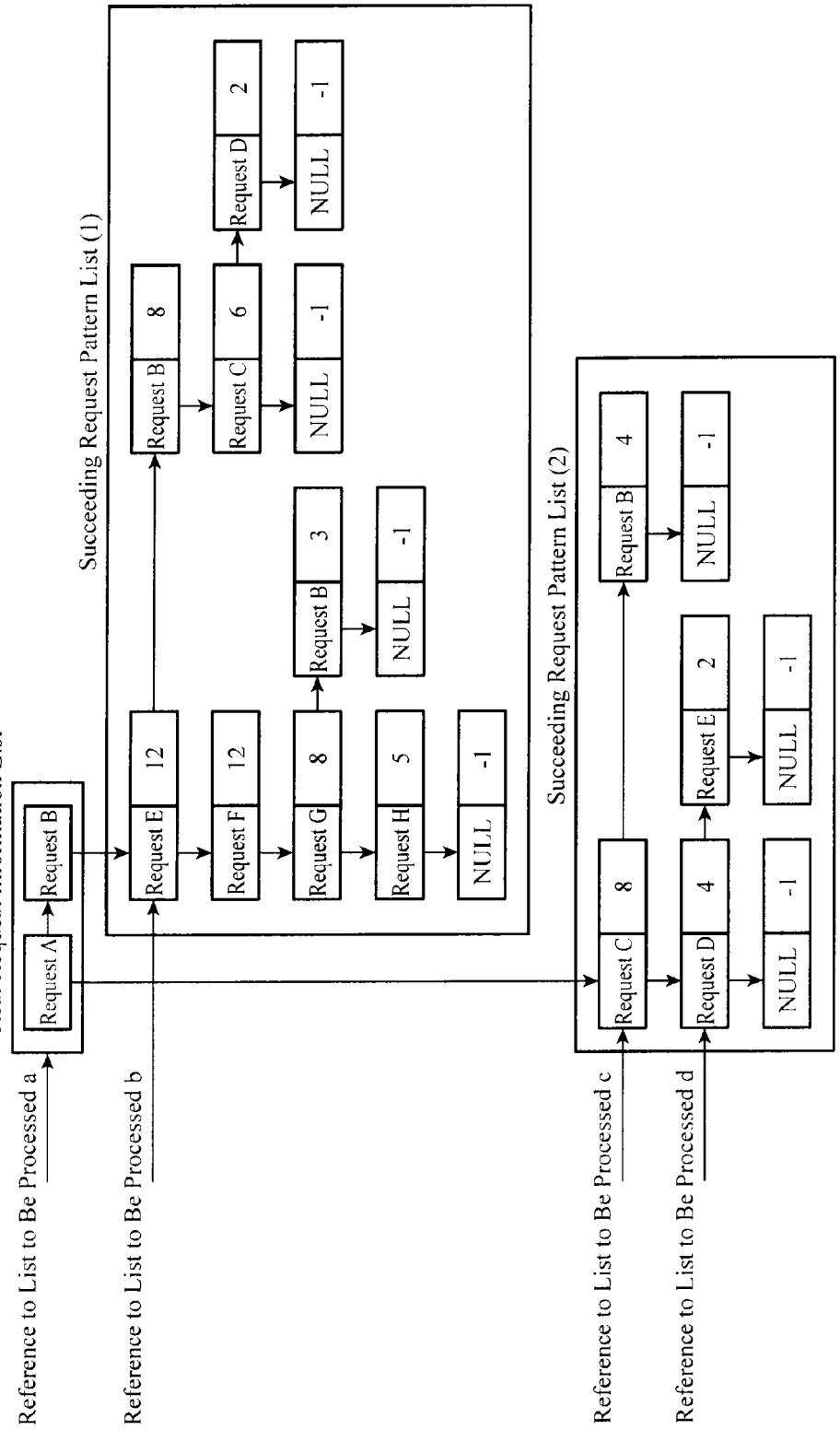
FIG. 12 is an explanatory drawing showing an example of reference to a list to be processed.
Figure 13:
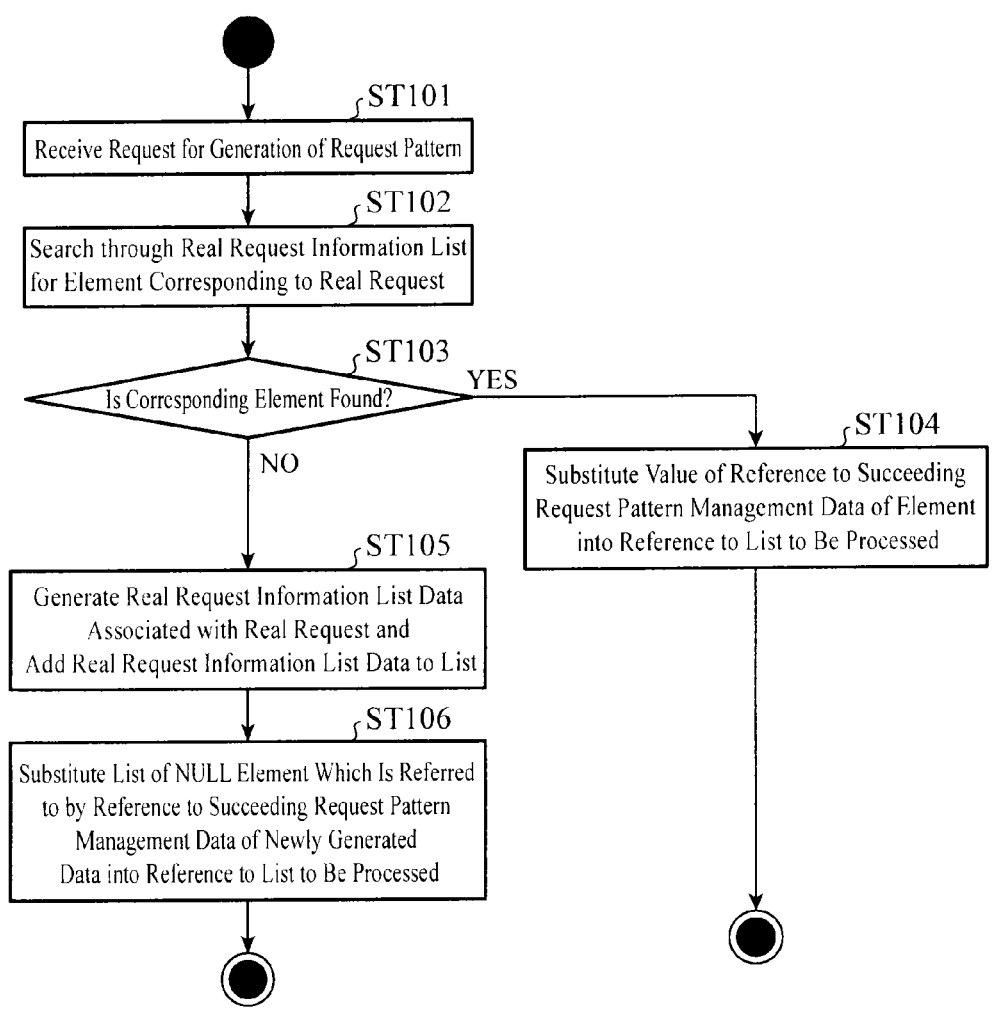
FIG. 13 is a flow chart showing a process of updating request time series analysis results at the time of acquiring a request pattern.
Figure 14:
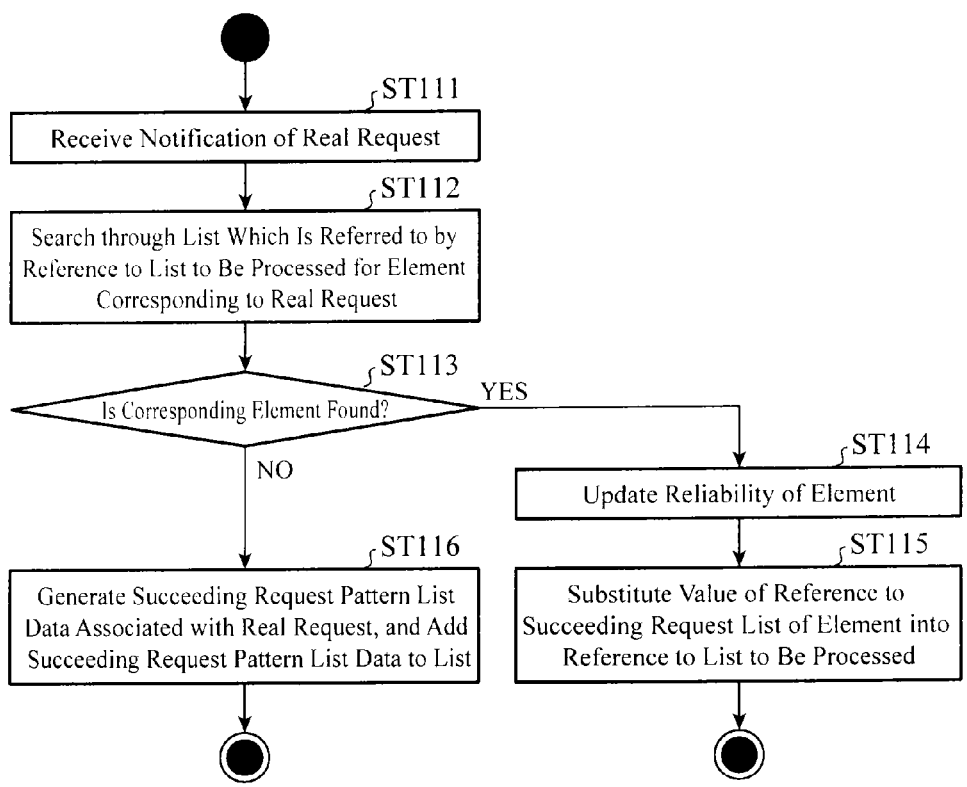
FIG. 14 is a flow chart showing a process of updating the request time series analysis results at the time of notifying an actual request.

FIG. 12 is an explanatory drawing showing examples of reference to a list to be processed. FIG. 12 shows a request pattern equivalent to that shown in FIG. 11, and four references a, b, c, and d are shown as concrete examples of the reference to a list to be processed. In addition, a flow of an update of the request time series analysis results at the time of issuing the command for generating a request pattern (step ST5 of FIG. 4) is shown in FIG. 13, and a flow of an update of the request time series analysis results at the time of notifying an actual request (step ST22 of FIG. 5) is shown in FIG. 14.

First, a process of updating the request time series analysis results at the time of issuing the command for generating a request pattern will be explained. When receiving the command for generating a request pattern (step ST101 of FIG. 13), the request pattern management device 34 searches through the actual request information list shown in FIG. 12 for an element corresponding to the actual request by using, for example, the actual request which is a parameter for a request for the generation of a request pattern from the actual request information list as a key (step ST102). When finding an element corresponding to the actual request (step ST103), the request pattern management device 34 substitutes the value of the "reference to succeeding request pattern management data" of an element corresponding to the actual request into "reference to list to be processed." As a result, the request pattern management device can determine from which list the request pattern is to be updated when a notification of an actual request is made the next time, and ends the updating process (step ST104).

When not finding any element corresponding to the actual request (step ST103), the request pattern management device 34 holds the actual request in the actual request information, generates an element in which a NULL element is set to the "reference to succeeding request pattern management data", and performs an update process of adding the element to the list (step ST105). After that, the request pattern management device substitutes the list of the NULL element generated in step ST105 into the "reference to list to be processed", and ends the updating process (step ST106).

Figure 15:
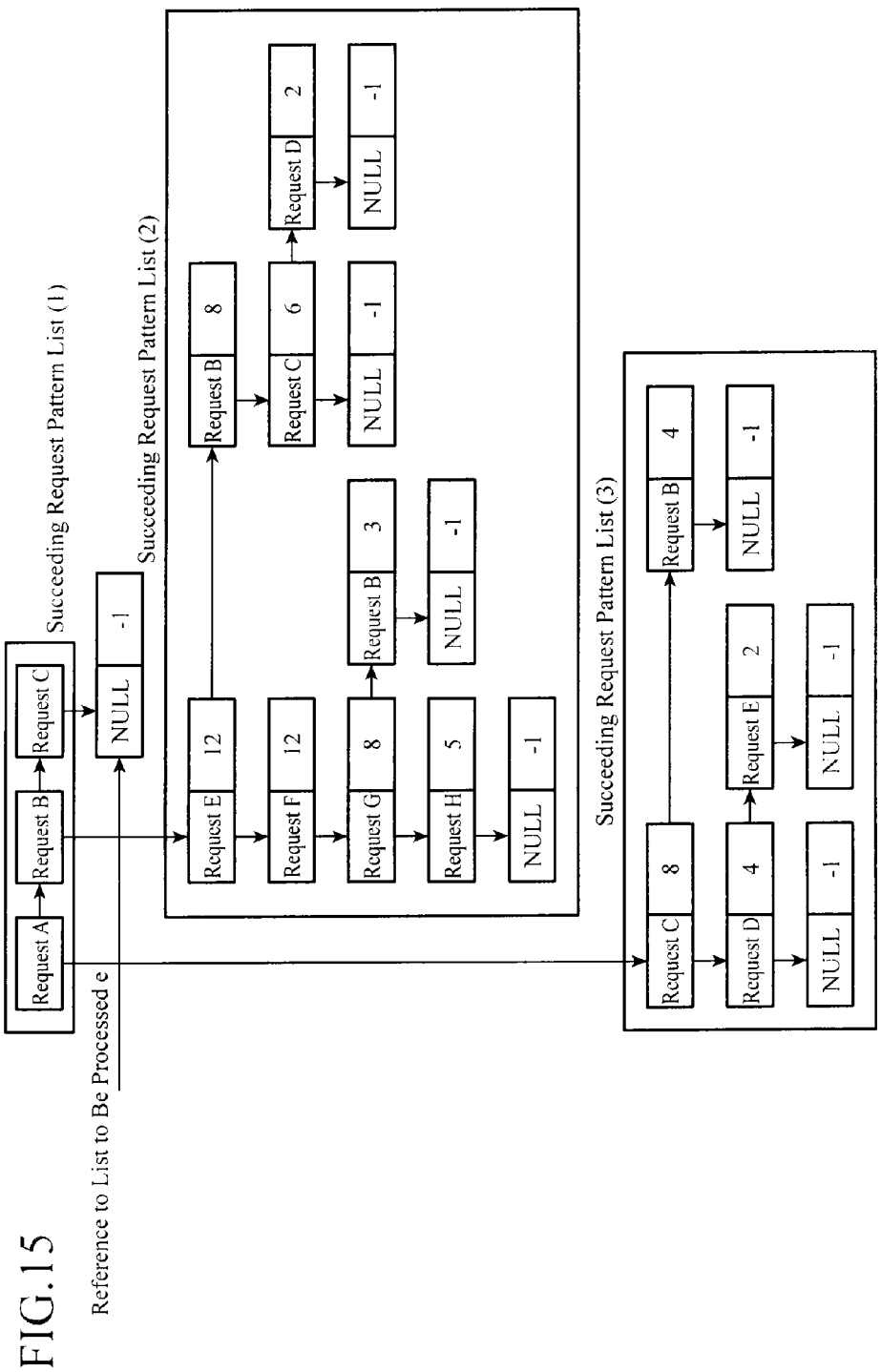
FIG. 15 is an explanatory drawing showing an example of the reference to a list to be processed.

For example, when the actual request B is received as a parameter in the case in which the "reference to list to be processed" is at the position of the "reference to list to be processed" a shown in FIG. 12, the "reference to list to be processed" is updated to the position of the "reference to list to be processed" b through the process of step ST104 because an element of the request B exists in the actual request information list. When the actual request C is received as a parameter, an element regarding the request C is added to the actual request information list, as shown in FIG. 15, through the processes of steps ST105 and ST106 and the "reference to succeeding request pattern management data" is set to have a predicted request pattern list e having only a NULL element because there is no element of the request C in the actual request information list. Further, the "reference to list to be processed" refers to a predicted request pattern list (1), as shown by "reference to list to be processed" e.

Next, a process of updating the request time series analysis results at the time of notifying an actual request will be explained. When receiving a notification of an actual request (step ST111 of FIG. 14), the request pattern management device 34 searches through the list which is referred to by the "reference to list to be processed" for an element corresponding to the actual request (step ST112). When finding an element corresponding to the actual request (step ST113), the request pattern management device 34 updates the reliability information of the element corresponding to the actual request (step ST114). For example, when the reliability information is the number of times that the actual request has been actually issued, the request pattern management device increments the value. After that, the request pattern management device 34 substitutes the value of the "reference to succeeding request list" of the element corresponding to the actual request into the "reference to list to be processed", and ends the updating process (step ST115). When not finding any element corresponding to the actual request (step ST113), the request pattern management device 34 adds an element to the list which is referred to by the "reference to list to be processed", sets the succeeding request information as the actual request of the parameter, and ends the updating process (step ST116).

Figure 16:
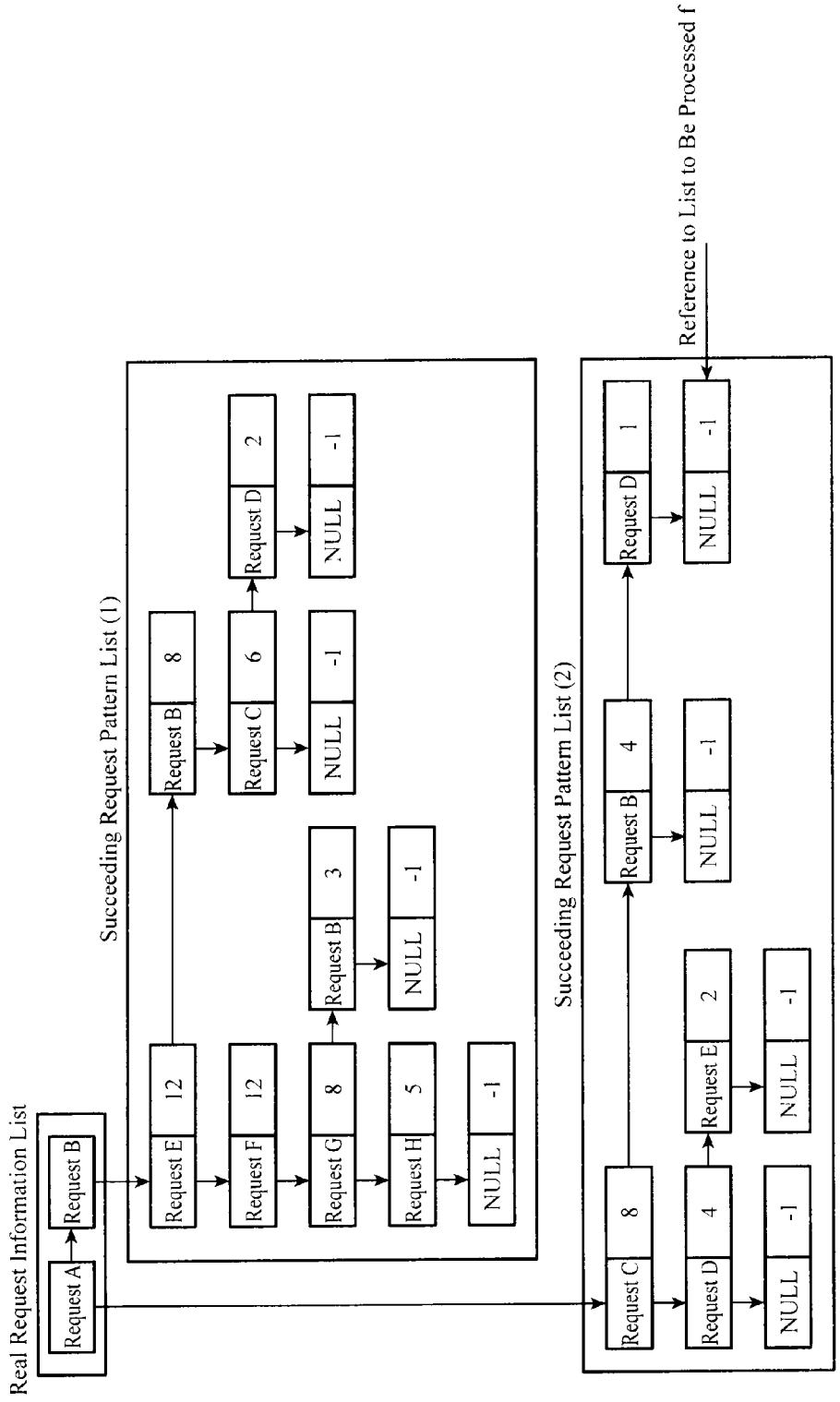
FIG. 16 is an explanatory drawing showing an example of the reference to a list to be processed.

For example, assuming that the actual request C is received as a parameter at the time of a notification of an actual request when the "reference to list to be processed" is the one c shown in FIG. 12, the reliability information of the request C is updated through the process of step ST114, and the "reference to list to be processed" is updated to a one d through the process of step ST115. Similarly, when the actual request D is received as a parameter, the request pattern is updated as shown in FIG. 16. Concretely, through the process of step ST116, an element regarding the request D is newly generated, and the "reference to succeeding request in same sequence" of the element regarding the request B in the list which is referred to by the reference c to a list to be processed is made to refer to the element regarding the request D. Further, the reliability information of the element regarding the request D is initialized, and the reference to next succeeding request list is made to refer to a list having a NULL element. In the meantime, the "reference to list to be processed" is updated as shown by "reference to list to be processed" f through the process of step ST116.

Next, a concrete process performed by the request pattern management device 34 will be explained. The request pattern management device 34 performs the process at the time of issuing the command for generating a request pattern (step ST5 of FIG. 4) or notifying an actual request (step ST22 of FIG. 5).

[the Details of Processing Performed at the Time of Issuing the Command for Generating a Request Pattern]

At the time of issuing the command for generating a request pattern (step ST5 of FIG. 4), a request is issued from the batch request processing device 33 to the request pattern management device 34 in a state in which a response corresponding to the actual request is not stored in the response storage device 31. The request pattern management device 34 performs a process of deriving a request pattern (predicted request pattern) which is determined to be issued with the highest probability from the request time series analysis results by using, as a key, the actual request which is received as a parameter from the batch request processing device 33, and returning the result of the deriving.

Concretely, the request pattern management device makes a comparison between the actual request information of all the data about the elements of the request time series analysis results, and the actual request which is a parameter, and derives data about the elements of the request time series analysis results, the data matching the actual request. Although the determination of whether they match each other can be performed by determining whether or not there is a full match between the data and the request description, or determining whether or not there is a partial match between the data and the request description. Concretely, a case in which the requested process matches the actual request information, but a part of the description provided as a parameter partially differs from the actual request information can be considered as a partial match.

Next, by using the reliability parameter from the succeeding pattern list of the data about the elements of the request time series analysis results, a succeeding pattern having the highest probability of being issued is found, and a pattern in which the actual request is set as the first element and the requests in the succeeding pattern found after that are connected in time-series order is determined as a predicted request pattern. The probability can be determined according to the magnitude of information (e.g., issue count) stored in the reliability parameter. As an alternative, by applying information stored in a plurality of reliability parameters to a function of calculating the probability, the probability can be calculated. For example, the probability can be calculated by using a function of multiplying the issue count by the reciprocal of the time difference between the current date and the latest date and time information actually issued. As an alternative, the probability can be calculated according to a criterion of judgment which is determined as the system. As a result, a request pattern having the highest probability is determined as a predicted request pattern.

Further, as another determining method of determining a request pattern, two or more types of request patterns can be selected as candidates, and a plurality of predicted request patterns can be combined into one new predicted request pattern. FIG. 17 is an explanatory drawing showing an example of the combination of predicted request patterns. In the example shown in FIG. 17, a predicted request pattern 1 is the one which is determined to have the highest probability of being issued, and a predicted request pattern 2 is the one which is determined to have the second highest probability of being issued. In this case, a method of, for example, implementing logical OR on the two types of predicted request patterns 1 and 2, and returning a predicted request pattern 3 which consists of the logical OR as processing results can be considered.

Because a plurality of predicted request patterns can be expressed as one predicted request pattern by using this method, the probability of being issued can be improved. Although a new predicted request pattern is generated by implementing logical OR on two predicted request patterns having a higher probability of being issued in this example, the present embodiment is not limited to this example. As an alternative, by applying a plurality of predicted request patterns to a certain determined composite function, a new predicted request pattern can be generated.

Further, as another determining method of determining a predicted request pattern, a part of the predicted request patter derived through the process can be determined as a predicted request pattern. For example, by assuming that each request of the predicted request pattern holds the number of times that, as a result of the system processing part of the request pattern including from the head up to the request itself, the prediction has failed at the request itself, a method of, when the value is equal to or greater than a threshold, removing the requests succeeding the request from the request pattern, and determining the request pattern including up to the request as a predicted request pattern can be considered. There can be considered a method of, when not taking time-series order into consideration and the request pattern is strictly determined as processing results, assuming that each request holds the number of times that the prediction has succeeded or failed at the request, forming a new request pattern by extracting all requests each holding the number of times equal to or greater than a certain threshold from the request pattern, and determining the new request pattern as a predicted request pattern.

The process of selecting one or more predicted request patterns each having the criterion value determined by the system or more on the basis of the request time series analysis results, and combining them to determine one predicted request pattern which is predicted to be issued after the actual request, as mentioned above, corresponds to that at the time of issuing the command for generating a request pattern (step ST5 of FIG. 4). Further, after the process, the predicted request pattern and the request patterns included in the request pattern list used when determining the predicted request pattern are maintained by the request pattern management device 34 until the prediction results are decided. Hereafter, these request patterns are referred to as request patterns to be predicted.

[the Details of Processing Performed at the Time of Notifying an Actual Request]

At the time of notifying an actual request (step ST22 of FIG. 5), a request is issued from the batch request processing device 33 to the request pattern management device 34 in a state in which a response corresponding to the actual request is stored in the response storage device 31. When receiving the notification of the actual request from the batch request processing device 33 as a parameter, the request pattern management device 34 recognizes that the prediction of a predicted request, which constructs a request pattern which is generated before receiving the notification, has succeeded (recognizes that the request is issued as predicted). Then, the request pattern management device 34 updates the information stored together with the request A matching the predicted request.

For example, there can be considered an update method of, when the information stored has pieces whose number is equal to the number of successes, incrementing the number of successes, or an update method of, when the information stored is a temporary prediction success or failure flag, setting the flag. As an alternative, the reliability parameter of each pattern in the succeeding pattern list can be re-calculated to update the value. By updating the reliability parameter, a predicted pattern list according to the using state of the system can be constructed, and the prediction precision can be improved. Further, when no request corresponding to the parameter exists in the above-mentioned request pattern, the request can be connected to the above-mentioned request pattern to construct new predicted pattern data, and this new predicted pattern data can be newly registered as an element of the predicted pattern list. This newly registration makes it possible to predict a new request pattern and improve the prediction precision. A method of adding the request as a new List element of the current request pattern without performing the new registration can be alternatively used.

Next, a concrete process performed by the batch request processing device 33 will be explained.

[The Process of Generating a Batch Request]

As a method of issuing a request from the GUI node 1 to the service node 2 according to HTTP, there can be considered a method of describing the request destination node and the request resource by using a URL (Uniform Resource Locator). Although a plurality of describing methods using a URI can be considered, a describing method as shown in FIG. 18 is provided, for example.

In the example shown in FIG. 18, [service node domain] which is the domain name of the service node 2 is described by the host name of a URL, [service name] which is the name of the service which is requested is described by the first directory name, and [API name] which is the name of an API (an API requested in the service) is described by the second directory name. By using a URL this way, the GUI node 1 can identify the communications partner from the host name of the URL uniquely, and the service node 2 can uniquely identify which API in which service is requested from [service name] and [API name] of the URL.

However, because an API performance request which can be issued by using one URL is limited to one having a single API name which a single service has in the describing method shown in FIG. 18, this describing method is not suitable for use in the method, as shown in the present invention, of issuing a plurality of API performance requests collectively. To solve this problem, there can be considered a method of excluding [service name] and [API name] from a URL and describing [batch request identifier] showing that the request is a batch request in the URL, as shown in FIG. 19. In this case, by describing information corresponding to a service name and an API name in a body part at the time of HTTP communications, the pieces of information can be notified to the request destination node.

In this case, APIs which the service node 2 has can be typically handled as functions, and many of them can receive arguments. More specifically, as information which should be described in the body part at the time of HTTP communications, the values of arguments to an API are also included. Because it is possible to usually set a plurality of arguments to an API, the plurality of arguments are collectively referred to as an argument list.

FIG. 20 is an explanatory drawing showing a concrete example of expressing a plurality of APIs for a single service and a plurality of argument lists for each API by using one text format data. This data describes the above-mentioned information as a multiplex array object in a JSON (JavaScript Object Notation) form. A top-level array (service request array object) describes the service name of a service which is a target of request by using the first element thereof. The top-level array expresses a concrete API which is requested for the service and arguments to the API as an array object (API array object) by using each of the second and subsequent elements thereof.

A plurality of API array objects can be specified, and the specification of a plurality of API array objects means that a request is made of the service to perform a plurality of APIs. Each API array object expresses the name of an API which Ls requested by using the first element thereof, and lists array objects (argument array objects) each expressing an argument list at the time of performing the API by using each of the second and subsequent elements thereof. In order to generate each argument array object, the argument array object can be generated by using an argument list accompanying each request of the request pattern acquired at the time of issuing the command for generating a request pattern (step ST5 of FIG. 4). Further, each API array object can be similarly generated by extracting an API for the same service included in the request pattern.

The provision of a plurality of argument array objects means that the API is performed the number of times corresponding to the number of argument array objects, and further means that a description of each argument array object is provided for the API as an argument to perform the API in each performance. As shown in FIG. 21, by constructing an array having one or more service request array objects (a batch request array object), a data structure with which requests for a plurality of services can be expressed collectively can be constructed.

When issuing a batch request, it is necessary to discriminate between the actual request and the predicted requests. As a method of discriminating between the actual request and the predicted requests, there can be considered a method of setting a rule of expressing the actual request by using the second element (first API array object) of the service request array object which is the first element of the batch request. As an alternative, the actual request can be expressed by adding an array element having "true" to the first element of the API array object, while a request other than the actual request can be expressed by adding an array element having "false" to the first element of the API array object. Further, when the order of the requests should be stored, the order can be stored by even placing the actual request at the head and, after that, constructing elements in such a way that the elements are arranged in the order of the predicted requests registered in the predicted request pattern. In this case, the number of service request array objects for each service is not necessarily only one.

It is possible to consider, as a concrete example of the batch request, an HTTP request having the above-mentioned batch request array object in its body part, specifying an URL as shown in FIG. 19, and issuing a POST command. The batch request is started by the batch request processing device 33 issuing the batch request to the communication device 35 through the process of step ST11 of FIG. 4, and the result of processing the batch request is returned, as a request enable or disable flag, to the batch request processing device 33 in step ST12. Further, the request enable or disable flag is returned to the GUI processing device 32 in step ST13.

[The Process of Registering the Handle Information, the Batch Request, and the Callback Function]

After generating the batch request, the batch request processing device 33 registers the information associated with the batch request in the response processing device 36. As the associated information, the handle information which the batch request processing device receives from the communication device 35 and which corresponds to the batch request, the callback function for processing the actual request when performing the process corresponding to the batch request, and so on can be considered. The response processing device 36 which receives the information associated with the batch request stores the information in a storage area with which the response processing device manages the information by itself, and sends the processing results to the batch request processing device 33.

[the Process of Notifying a Batch Response and a Communication Handle]

After transmitting the batch request to the service node 2 via the network 3, the communication device 35 receives a batch response corresponding to the batch request transmitted from the service node 2. When receiving a batch response corresponding to the batch request, the communication device 35 notifies the batch response to the response processing device 36, and also notifies handle information showing the communication process of issuing the request corresponding to the response to the response processing device 36.

Hereafter, a concrete example of the batch response sent back from the service node 2 will be explained. FIG. 22 is an explanatory drawing showing a concrete example of the data expression of the response. In the example shown in FIG. 22, data is expressed in a JSON form, like a request. In a typical function, two types of values including a return value of the function and a response using a reference argument exist. While only one object is usually set as the return value, a plurality of objects can be set as the reference argument. Therefore, the response can be expressed as an array object in a JSON form which stores the return value of a function in the first element thereof and a reference argument in each of the second and subsequent elements. Further, there is a case in which the return value is void, and this case can be coped with by setting a null value, a null character or the like to the first element.

The batch response can be expressed as an array object having, as an element, a response as explained above. FIG. 23 is an explanatory drawing showing a concrete example of the data expression of the batch response. In the example shown in FIG. 23, each response is stored while the order in which the requests are stored in the batch request is maintained. More specifically, when a rule of placing an actual request as the first request is made, the first element of this batch response is a real response corresponding to the actual request.

When receiving the batch response and the communication handle from the communication device 35, the response processing device 36 retrieves the information corresponding to the communication handle from the information registered previously to acquire the corresponding batch request and the corresponding callback function. The response processing device 36 pairs the response which is combined into the batch response and which corresponds to each of the requests with the request, and stores the pair in the response storage device 31. Through this process, all the responses are stored in the response storage device 31 in a form in which each response can be searched for by using the request description as a key. The response storage device 31 sends the stored results back to the response processing device 36 in step ST16. Further, by executing the callback function corresponding to the request A which is an API performance request (actual request), the response processing device 36 notifies the response A corresponding to the request A to the GUI processing device 32. At least the real response corresponding to the actual request is sent, as a parameter, to the callback function, so that the callback function performs its process. The processing results of the callback function is returned to the response processing device 36 in step ST18.

Hereafter, an application to a concrete service will be mentioned as an example. A further concrete example will be explained by using a map image shown in FIG. 24 by taking, as an example, a service for drawing an image of a map of an area surrounding the current position in, for example, a car navigation system.

In general, in the case of the service for drawing an image of a map of an area surrounding the current position, the map of the area surrounding the current position is drawn on the whole of a screen of a GUI, and a vehicle position icon showing the current position is drawn on the map image to visually express the current position on the map. In addition, a display of a place name for drawing the address of the current position, etc., a bearing for the contents drawn in the map, a map scale showing the scale of the map, and the current time are drawn on the map image.

Figure 25:
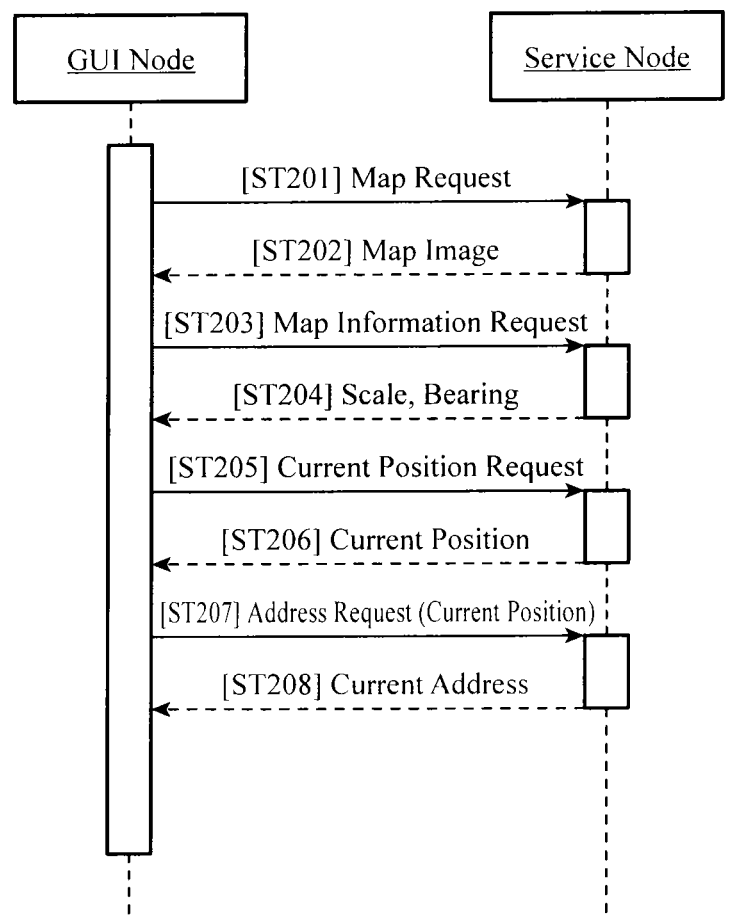
FIG. 25 is a sequence diagram showing an example of a request accompanying a map update.

By inquiring of the service node 2 (making a request), instead of generating these pieces of information including the map image, the current position, the address, the bearing, the scale, and the current time, the GUI node 1 acquires the pieces of information and uses them for drawing. However, in a case of a system to which the present invention is not applied, a GUI node 1 makes data requests (a map request, a map information request, a current position request, and an address request) of a service node 2 in processes of steps ST201, ST203, ST205, and ST207, as shown in FIG. 25, and receives responses (a map image, a scale and a bearing, the current position, and the current address) respectively corresponding to the data requests from the service node 2 in processes of steps ST202, ST204, ST206, and ST208. When performing the above-mentioned processes, four communications in total occur between the GUI node 1 and the service node 2. These processes occur every time when map drawing is performed. It is assumed that as the current time, the time information which the GUI node 1 has is used.

In contrast, in the system to which the present invention is applied, before issuing a map request corresponding to the process of step ST201 to the service node 2, the GUI node 1 acquires a request pattern having a high possibility of being issued the next time after the map request and makes requests collectively as a batch request by using the batch request generating device 33 and the request pattern management device 34. Even if some requests or all requests in the predicted request pattern are wrong, an actual request which is an actual request is issued repeatedly, so that the request pattern management device 34 updates the request pattern succeeding the map request, it is reflected that the requests succeeding the map request are a map information request, a current position request, and an address request, and the request pattern which can be predicted correctly can be generated on a long-term basis.

Concretely, at the time of issuing the command for generating a request pattern (step ST5 of FIG. 4) and at the time of notifying an actual request (step ST22 of FIG. 5), the information regarding the actual request notified from the batch request processing device 33 to the request pattern management device 34 can be used, and the information regarding the issue count of each request pattern can be updated on the basis of the time series pattern of actual requests which have been issued until then or the request patterns to be predicted. More specifically, because requests occur in the order of a map request, a map information request, a current position request, and an address request every time when a map update occurs, the issue count of the request pattern increases. As a result, by using the request pattern having the largest issue count as the predicted request pattern, correct prediction can be performed, and the number of communications which have to be performed four times can be reduced to one on a long-term basis.

Figure 26:
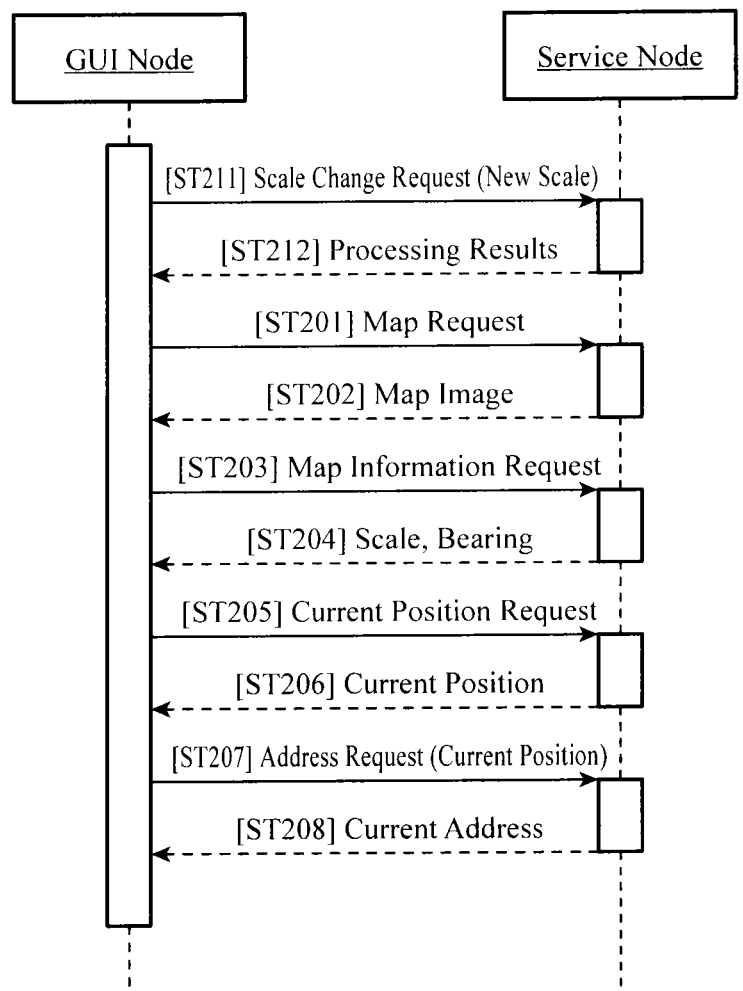
FIG. 26 is a sequence diagram showing an example of a request accompanying a scale change.

On the other hand, it is assumed that when the user makes a forcible change to the map scale while the processing is performed, a scale change request is issued from the GUI node 1 to the service node 2 with new scale information being set as a parameter in the process of step ST211, as shown in FIG. 26, and, after that, a map request, a map information request, a current position request, and an address request are issued. Because in the above-mentioned case, when a scale change is made for the first time, a request pattern at a time when the scale change request is an actual request is not stored in the request pattern management device 34, only the scale change request is issued to the service node, and the batch request process is started from the next map request. Through the process, the request pattern management device 34 learns that a map request, a map information request, a current position request, and an address request are issued continuously after the scale change request, and generates the request pattern newly. As a result, when a scale change request is issued for a second or subsequent time, the batch request processing device 33 generates a batch request in which a map request, a map information request, a current position request, and an address request are predicted requests according to the newly generated request pattern, and transmits the batch request to the service node 2.

As can be seen from the above description, in accordance with this embodiment 1, the batch request processing device 33 that, when a response corresponding to a performance request issued by the GUI processing device 32 is stored in the response storage device 31, outputs an output command for outputting the response to the GUI processing device 32 to the response processing device 36, whereas when no response corresponding to the performance request is stored in the response storage device 31, commands the request pattern management device 34 to predict a request which may be issued following the performance request and generate a request pattern which consists of the performance request and the predicted request, and generates a batch request including the request pattern generated by the request pattern management device 34, the request pattern management device 34 that predicts a request which may be issued following the performance request, and generates a request pattern which consists of the performance request and the predicted request, and the communication device 35 that transmits the batch request generated by the batch request processing device 33 to the service node 2, and receives a batch response transmitted from the service node 2 and corresponding to the batch request are disposed, and the response processing device 36 is constructed in such a way as to, when receiving the output command from the batch request processing device 33, output the response stored in the response storage device 31 and corresponding to the performance request to the GUI processing device 32, and, when receiving a batch response is received by the communication device 35, stores a response corresponding to the performance request and a response corresponding to the predicted request, the responses being included in the batch response, in the response storage device 31 and also outputs the response corresponding to the performance request to the GUI processing device 32. Therefore, there is provided an advantage of eliminating the necessity to transmit a performance request when a response corresponding to the performance request is stored in the response storage device 31, thereby being able to sufficiently reduce the number of times that network communications associated with the cooperative process are performed.

More specifically, through the series of processes by the GUI nodes 1 and the service node 2, from a single actual request actually issued by the GUI node 1, one or more requests which are predicted to be issued following the actual request can be determined. Therefore, a batch request into which the actual request and the one or more predicted requests are combined can be generated and notified to the service node 2. Further, the service node 2 can receive the batch request, and can process each request which is a description of the batch request for each service, and can also generate a batch response into which one or more responses to the requests are combined, and send the batch response back to the GUI node 1. In addition, the GUI node 1 which receives the batch response can store the description of the batch response, and, before issuing a request corresponding to the stored result, use the stored result therein, thereby being able to reduce the number of times that communications with the service node 2 are performed, and making it possible for the system to avoid reduction in the processing speed due to communications. Further, the system can manage the success or failure information about the predicted results, and can update the pattern of the generation of the predicted requests by adjusting the prediction parameters according to the usage status or the like of the system.

Embodiment 2

Although the request pattern management device 34 predicts a request which may be issued following an API performance request and generates a request pattern which consists of the API performance request and the predicted request is shown in above-mentioned Embodiment 1, the request pattern management device 34 can alternatively manage a history of performance requests issued by the GUI processing device 32 for each screen displayed on a GUI, perform a process of updating the issuing frequency of each performance request, and, even if a performance request newly issued by the GUI processing device 32 is the same performance request, generate a different request pattern when the screens displayed on the GUI differ from each other. Concretely, the request pattern management device operates in the following way.

It is assumed that considering the whole of a service, a pattern of requests which will be issued following a request differs for each screen displayed by the GUI node 1 even if the request is the same. For example, even if the request is the same as a map request in the case of displaying a screen of a map of an area surrounding the current position as shown in FIG. 24, there is a high possibility that a request which will be issued following the request differs when contents to be displayed on the screen differ.

Figure 27:
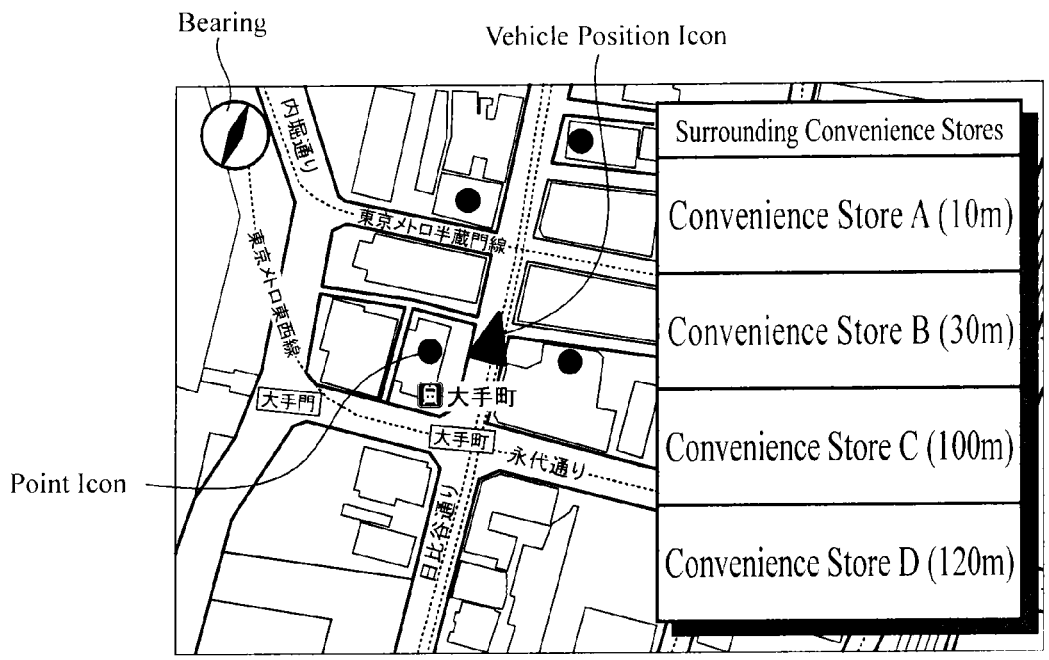
FIG. 27 is an explanatory drawing showing an example of a map image displayed on a GUI.
Figure 28:
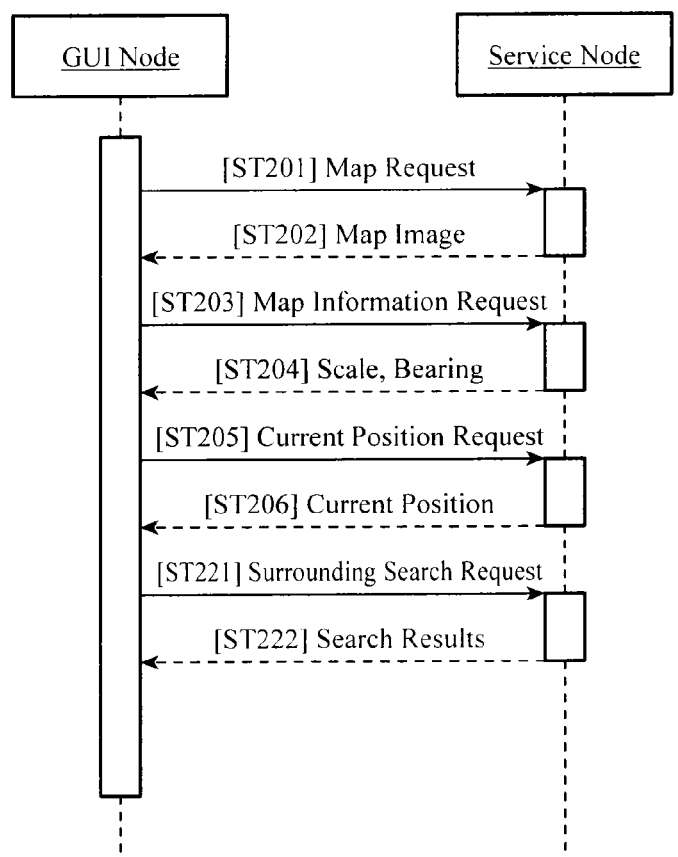
FIG. 28 is a sequence diagram showing an example of requests accompanying a screen shown in FIG. 27.

FIG. 27 shows another example of the screen which the GUI node 1 displays. While up to a drawing process of drawing a map while drawing a bearing and a vehicle position icon is the same as that shown in the example shown in FIG. 24, a point icon that draws where on the map a certain point exists by using an icon, and a point list button that displays buttons each showing basic information regarding the point icon (a point name and the distance from the current position) in a list form are also drawn. While this example is the same as that shown in FIG. 24 in that requests which are issued following the map request are a map information request and a current position request, this example differs from that shown in FIG. 24 in that a surrounding search request is issued after the requests, as shown in FIG. 28.

Figure 24:
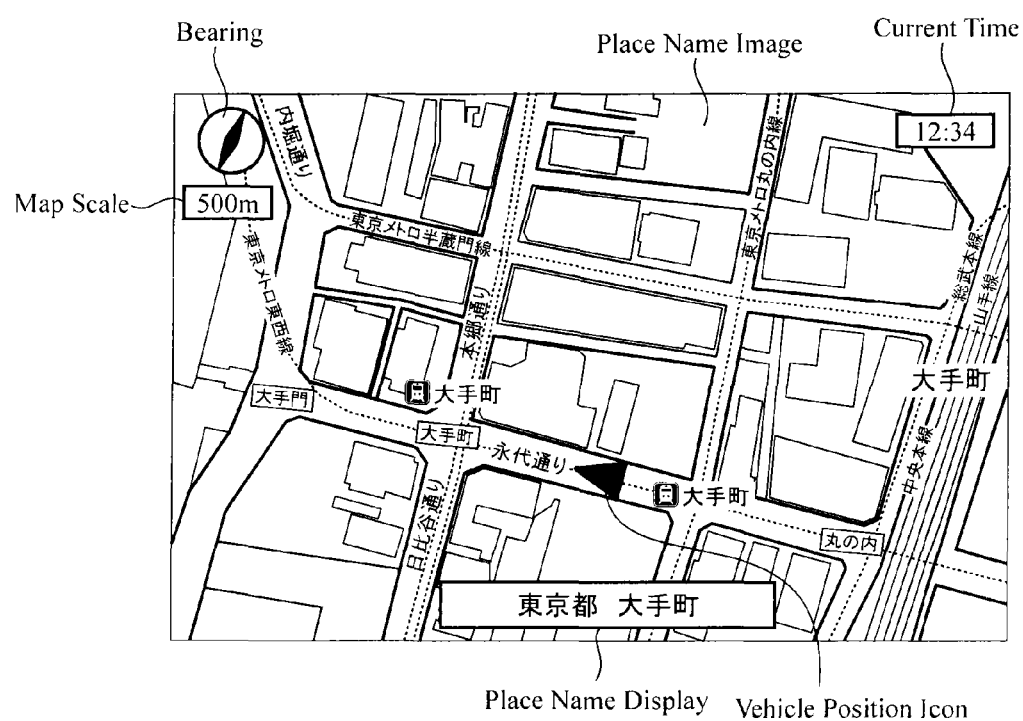
FIG. 24 is an explanatory drawing showing an example of a map image displayed on a GUI.

Therefore, a problem is that in a case in which the request pattern management device 34 performs pattern management by using the same request time series analysis results for the screen of FIG. 24 and for the screen of FIG. 27, when, for example, the request pattern management device makes a transition to the screen of FIG. 24 and then operates after operating for a while on the screen of FIG. 27, the final predicted request in a predicted request pattern is not an address request, but a surrounding search, and an appropriate request pattern cannot be determined as the predicted request pattern. Then, the request pattern management device 34 generates request time series analysis results independent for each screen to cope with the above-mentioned problem.

Figure 29:
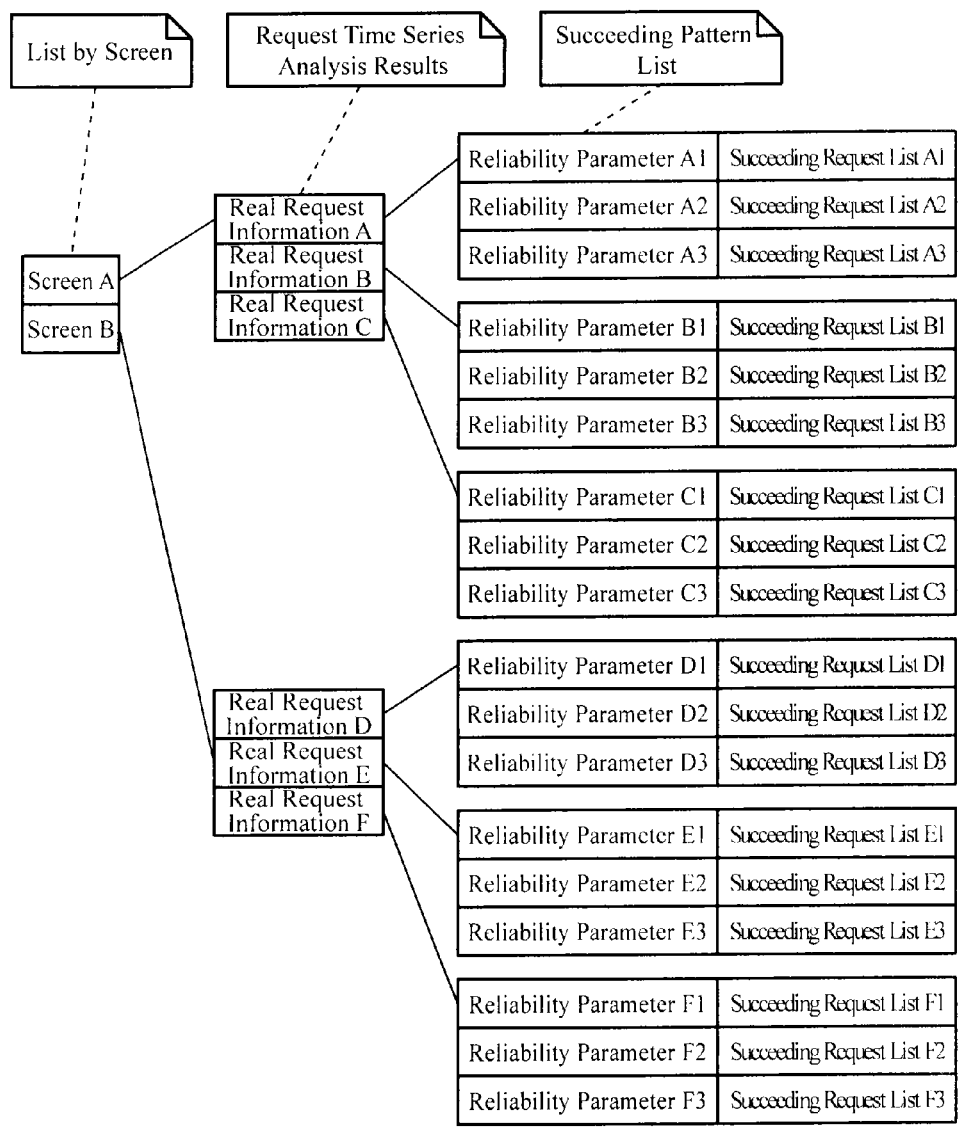
FIG. 29 is an explanatory drawing showing an example of the data structure of the request time series analysis results in the case of performing independent request pattern management for each screen.

FIG. 29 is an explanatory drawing showing an example of the data structure of the request time series analysis results in the case of performing request pattern management independent for each screen. The request time series analysis results shown in FIG. 29 have a data structure having the data structure of elements of the request time series analysis results of FIG. 8 as an element, and use an actual request as a key and have a list structure having a succeeding pattern list succeeding the actual request. Further, the succeeding pattern list shown in FIG. 29 has a data structure having the data structure of elements of the succeeding pattern list of FIG. 8 as an element, and has a list structure having a reliability parameter for each succeeding pattern.

The request pattern management device 34 acquires a corresponding succeeding pattern list from the request time series analysis results by using the actual request as a key, and determines the predicted request pattern on the basis of the succeeding pattern list. Although a single set of request time series analysis results is managed even if the screen is changed, as previously explained, the data structure makes it possible to manage a different set of request time series analysis results for each screen by introducing a list by screen to define the different set of request time series analysis results for each screen. By defining the different set of request time series analysis results for each screen, the problem, as explained with reference to the examples of FIGS. 24 and 27, that an appropriate predicted request pattern cannot be generated by prediction based on the same request time series analysis results for each screen.

By receiving screen information currently being processed from the batch request processing device 33 every time when the screen is changed, the request pattern management device 34 can know which screen, among the lists by screen, is displayed, and can perform determination of request pattern management and a predicted request, the determination being based on an appropriate actual request list. Further, the batch request processing device 33 can use a request for the acquisition of GUI descriptive data, which is issued from the GUI processing device 32 to the service node 2, as a trigger to notify the next screen information to the request pattern management device 34. As an alternative, the response processing device 36 can perform the same process by using the time when the response processing device receives a response corresponding to the GUI descriptive data acquisition request from the service node 2 as a trigger.

Further, when the GUI node 1 holds screen information, the GUI processing device 32 can cope by notifying the next screen information to the request pattern management device 34 at the time when a screen transition occurs. For example, assuming that the request pattern management device 34 has the request time series analysis results as shown in FIG. 29, and a screen A in a list by screen means the one shown in FIG. 24 and a screen B in a list by screen means the one shown in FIG. 27, when displaying the screen shown in FIG. 24, the request pattern management device 34 performs the process with reference to the actual request list which is referred to by an element of the screen A in the list by screen. At that time, the batch request processing device 33 notifies the screen B which is the screen information which is the transition destination to the request pattern management device 34 by using the GUI descriptive data acquisition request as a trigger. When receiving the notification, the request pattern management device 34 switches the actual request list which is the target to be processed to an actual request list which is referred to by an element of the screen B in the list by screen, and performs subsequent processes with reference to the switched actual request list.

Embodiment 3

A method of generating request time series analysis results which the request pattern management device 34 uses will be explained in this Embodiment 3. The request time series analysis results are the results of collecting and analyzing information regarding a pattern of requests which have been issued immediately after an actual request was issued, and is an aggregate of patterns each of which consists of information regarding a finite number of requests which is one or more patterns. As each pattern, on the basis of an API performance request which is notified from the GUI processing device 32 to the batch request processing device 33, the request time series analysis results which are the results of dynamically collecting and analyzing information regarding the request, information regarding time-series order in which the request is issued, and so on are generated. Further, when processing a command for generating a request pattern from the batch request processing device 33, the request pattern management device 34 constructs a predicted request pattern on the basis of the descriptions of request time series analysis results.

As a concrete example of the request time series analysis results, for example, there is a method of, for each of all collected request patterns as shown in FIG. 29, when a request which is the head of the request pattern is actually issued, providing and managing a reliability parameter used as a measure of determining whether a request having the same pattern as a corresponding succeeding pattern is issued following the request. In this case, the number of requests included in the request pattern into which each actual request and the succeeding request pattern are combined must be limited. Hereafter, a concrete method of making each request pattern included in the request time series analysis results have a finite number of requests will be explained.

(1) As one method of constructing a pattern including a finite number of requests, there can be considered a method of setting a maximum for the number of requests in each request pattern. For example, when the maximum for the number of requests is set to 5, all the predicted request patterns which the request pattern management device 34 generates have a maximum of 5, and a pattern which consists of a finite number of requests can be constructed. FIG. 30 is an explanatory drawing showing an example of the generation of the request pattern data in the case in which the maximum number of predicted request patterns is set to 5. In this embodiment, for the sake of simplicity, it is assumed that the request pattern management device 34 is placed in a state of having no request pattern data at first. It is assumed that in the state, requests are notified from the GUI processing device 32 to the batch request processing device 33 in order indicated by arrows shown in a request issue time series list.

When a first request A is notified to the batch request processing device 33, the request A is notified to the request pattern management device 34, and the request pattern management device 34 generates actual request information A (refer to request time series analysis results (1)), and also generates a request pattern list having an initial value and establishes an association with the actual request information A (refer to request time series analysis results (2)). When processing up to four requests succeeding the first request, the request pattern management device shifts to a phase of insertion into the newly generated request pattern list.

After that, when requests B, C, and D and E are notified in order, the request pattern management device 34 inserts each of the requests into the end of a succeeding request list generated immediately before in turn (refer to request time series analysis results (3)). Because the number of requests in the succeeding request list is 4 and the number of actual requests is 1, and hence the number of requests is 5 in total when the request E is inserted into the succeeding request list, the request pattern management device 34 shifts to a phase of, when the next request is notified, processing this request as actual request information.

After that, when a request F is notified, the request pattern management device 34 checks whether the actual request information list of the request pattern data has information matching the request F. It is clear, as a result, that the actual request information list does not have information matching the request, and the request pattern management device 34 generates actual request information F (refer to request time series analysis results (4)), and also generates a request pattern list having an initial value and establishes an association with the actual request information F (refer to request time series analysis results (5)). When processing up to four requests succeeding the request, the request pattern management device shifts to a phase of insertion into the newly generated request pattern list.

After that, when requests G, H, and I and J are notified in order, the request pattern management device 34 inserts each of the requests into the end of a succeeding request list generated immediately before in turn (refer to request time series analysis results (6)). Because the number of requests in the succeeding request list is 4 and the number of actual requests is 1, and hence the number of requests is 5 in total when the request J is inserted into the succeeding request list, the request pattern management device 34 shifts to the phase of, when the next request is notified, processing this request as actual request information.

After that, when the request A is notified, the request pattern management device 34 checks whether the actual request information list of the request pattern data has information matching the request A. When it is clear, as a result, that the actual request information list has information matching the request, the request pattern management device 34 generates a request pattern list having an initial value for the actual request information matching the request and establishes an association as a new element (refer to request time series analysis results (7)). When processing up to four requests succeeding the request, the request pattern management device shifts to a phase of insertion into the newly generated request pattern list.

After that, when requests K, L, and M and N are notified in order, the request pattern management device 34 inserts each of the requests into the end of a succeeding request list generated immediately before in turn (refer to request time series analysis results (8)). Because the number of requests in the succeeding request list is 4 and the number of actual requests is 1, and hence the number of requests is 5 in total when the request N is inserted into the succeeding request list, the request pattern management device 34 shifts to the phase of, when the next request is notified, processing this request as actual request information.

By repeating the above-mentioned processing, a request pattern in which the maximum number of requests is specified to be a fixed number can be constructed. Although the maximum number of requests can be fixed as the whole system, for example, the maximum number of requests can be set to be a fixed value different for each GUI screen. As an alternative, the fixed value can be changed according to conditions. For example, there can be considered a method of, when the success rate of prediction of a batch request issued from the GUI node 1 (e.g., a probability that an issue of a predicted request other than actual requests is actually requested of the batch request processing device 33 by the GUI processing device 32 after the batch request is generated) is equal to or greater than a threshold, incrementing the fixed value to increase the number of elements which can be set to a request pattern, and increasing the number of requests which are transmitted by using the batch request to implement a further reduction in the number of times that communications are performed. When changing the fixed value according to this success rate, a method of setting a fixed value for each request pattern can be used.

(2) As another method of constructing a finite number of request patterns, there can be considered a method of using the time intervals at which an API performance request is notified from the GUI processing device 32 to the batch request processing device 33. In general, when a certain series of processes is started and a plurality of APIs are performed in the series of processes, the time intervals at which each of the APIs is performed are generally short in many cases as compared with those at which a user operation is performed. Therefore, a time interval which has elapsed until a different series of processes occurs again in response to a trigger, such as a user operation, after a series of processes has been completed is long in many cases as compared with the time intervals at which each of the APIs in the series of processes is performed. A time interval which has elapsed between the time when a request was notified immediately before and the time when a request is notified currently is measured by using such conditions, and, when the time interval is shorter than a predetermined threshold (predetermined time interval), it can be determined that the two requests are included in a series of processes.

Figure 31:
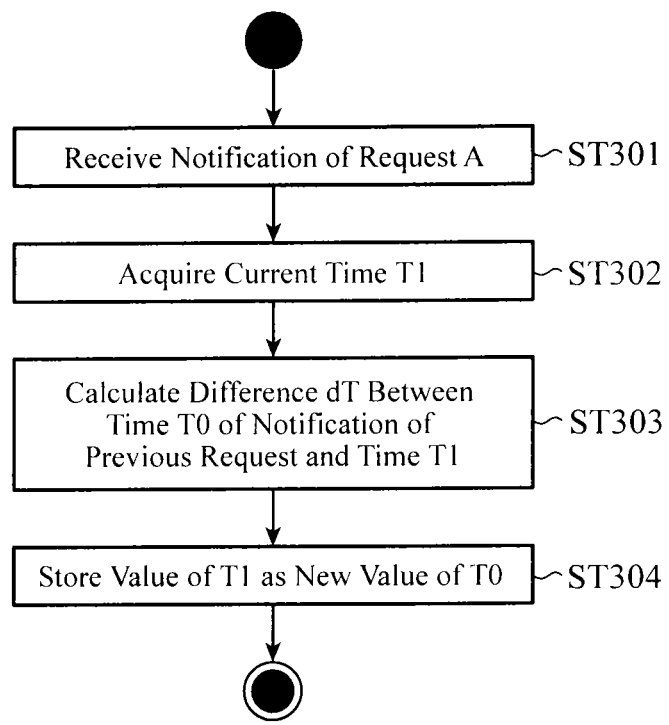
FIG. 31 is a flow chart showing a process calculating an elapsed time from a notification of a previous request to a notification of a current request.

Concretely, although time intervals at which a map request, a map information request, a current position request, and an address request, which are a series of requests included in a map updating process shown in FIG. 25, are issued are short, a time interval which has elapsed until the next map request is issued since the address request is assumed to be a time interval which has elapsed until a new screen update timing occurs. This means that this time interval is long. In order to perform the above-mentioned process, the request pattern management device 34 which uses this method needs to calculate a time interval which has elapsed since the previous request was notified when a request is notified. FIG. 31 is a flow chart showing the process of calculating the elapsed time from the notification of the previous request to the notification of the current request.

When receiving the notification of the request A which is the current request from the batch request processing device 33 (step ST301), the request pattern management device 34 acquires the current time T1 (step ST302). After that, the request pattern management device calculates the difference dT between the time T0 of the notification of the previous request and the time T1 (step ST303). This difference dT is the elapsed time for the request A. When T0 has not been set, dT is set to zero. The request pattern management device 34 completes the process of calculating the elapsed time by substituting the value of T1 into a new value of T0 (step ST304).

When the elapsed time dT which is calculated through this process is less than a threshold sT which is predetermined as the system, the request pattern management device 34 performs a process of adding the request A which is notified currently to the request pattern to which the request notified previously belongs. In contrast, when the elapsed time dT is equal to or greater than the threshold sT, the request pattern management device handles the request A which is notified currently as a new actual request without adding the request A to the request pattern to which the request notified previously belongs.

FIG. 32 is an explanatory drawing showing an example of the generation of the request pattern data in the case of using the elapsed time. It is assumed that requests are notified from the GUI processing device 32 to the batch request processing device 33 in order indicated by arrows shown in a request issue time series list. Further, each single line arrow, among the arrows, means that the elapsed time which is calculated from the difference between the time when the request to the right of the arrow is notified and the time when the request to the left of the arrow is notified is less than the threshold sT, and each double line arrow means that the elapsed time is equal to or greater than sT.

When a first request A is notified, the request pattern management device 34 calculates the elapsed time while determining that the request A is an actual request because no previous request exists. As a result, the request pattern management device generates actual request information A, and also generates a request pattern list having an initial value and establishes an association with the actual request information A (refer to request time series analysis results (1)). Next, when a request B is notified, the request pattern management device 34 calculates the elapsed time, and, as a result, determines that the elapsed time is less than the threshold sT. Because the request B belongs to the request pattern to which the previous request A belongs when the elapsed time is less than the threshold sT, the request pattern management device inserts the request B as an element of the latest succeeding request list of the actual request A (refer to request time series analysis results (2)). Because the elapsed time for each of requests C and D notified succeedingly is also less than the threshold sT, the request pattern management device inserts each of the requests as an element of the latest succeeding request list of the actual request A, like in the case of the request B (refer to request time series analysis results (3)).

Next, when a request E is notified, the request pattern management device 34 calculates the elapsed time, and, as a result, determines that the elapsed time is equal to or greater than the threshold sT. Because this current request does not belong to the request pattern to which the previous request belongs when the elapsed time is equal to or greater than the threshold sT, the request pattern management device determines that the request E is an actual request. As a result, the request pattern management device generates actual request information E, and also generates a request pattern list having an initial value and establishes an association with the actual request information E (refer to request time series analysis results (4)). After that, when the request A is notified for a second time, the request pattern management device 34 calculates the elapsed time, and, as a result, determines that the elapsed time is equal to or greater than the threshold sT. Because this current request does not belong to the request pattern to which the previous request belongs when the elapsed time is equal to or greater than the threshold sT, the request pattern management device determines that the request A is an actual request. However, because the actual request information A has existed, the request pattern management device waits for the notification of the next request by handling the existing actual request information A as the target to be processed without newly generating the actual request information.

Next, when requests B, C, and D are notified in turn, the request pattern management device calculates the elapsed times of all the requests, and determines that each of the elapsed times is less than the threshold sT and also determines that the requests are a request pattern succeeding the actual request A. In this case, because this pattern matches that of the existing succeeding request list of B, C, and D, the request pattern management device continues holding information showing what description corresponding to which element of the succeeding request list the current request has. More specifically, when the request B is notified, the request pattern management device holds information showing the first request B of the succeeding request list, when the request C is notified, the request pattern management device holds information showing the second request C of the succeeding request list, and when the request D is notified, the request pattern management device holds information showing the third request D of the succeeding request list.

It is clear that when the request D is finally notified, the set of A, B, C, and D which is a request pattern is issued twice. However, when the elapsed time of a request E which is notified the next time is less than the threshold sT, the current request pattern is not determined yet, and is assumed to be a request pattern including at least the requests A, B, and C, D, E, or a request pattern in which a further request succeeds the requests. In contrast, when the elapsed time is equal to or greater than the threshold sT, the current request pattern is determined to be A, B, C, D, and E. More specifically, when the elapsed time is equal to or greater than the threshold sT, it is determined that the time series pattern of requests actually notified matches an existing request pattern. In this case, an update is performed in such a way as to strengthen the reliability parameter of the existing request pattern matching the time series pattern. By performing an update in such a way as to strengthen the reliability parameter, the precision of using the request pattern when generating a batch request is improved, and, as a result, the probability that the prediction has succeeded can be improved. In contrast, because it is determined that the time series pattern of requests actually notified does not match any existing request pattern when the elapsed time is less than the threshold sT, at that time, the request pattern management device newly generates a request pattern list having an initial value, sets the requests B, C, and D and E to the succeeding request list in the request pattern list, and establishes an association with the actual request information A (refer to request time series analysis results (6)).

By using the method of determining the structure of a request pattern from the elapsed time from the notification of the previous request to the notification of the current request in the above-mentioned way, a request pattern having a longer size as compared with a request pattern determined using the method of specifying the maximum number of elements in a request list can be constructed, and the determination of a request pattern according to the operation conditions of the system can be performed.

(3) As another method of constructing a finite number of request patterns, there can be considered a method of using a request type. Requests issued from the GUI node 1 to the service node 2 include, in addition to an API performance request, a GUI descriptive data acquisition request for the acquisition of GUI descriptive data for displaying a next screen at the GUI node, and a system information acquisition request to perform a broadcast to all nodes existing on the network to verify the existence of each of the nodes, and can be classified according to their descriptions.

It is unpreferable that when a GUI descriptive data acquisition request is issued, a request pattern is determined to continuously include requests before and behind the GUI descriptive data acquisition request, because this request means that contents displayed on the screen at the GUI node 1 are updated. A request which serves as a reference that breaks the continuity of a request pattern before and behind the request, like this GUI descriptive data acquisition request, is referred to as a termination request.

In order to construct a finite number of request patterns by using this termination request, there is a necessity for the request pattern management device 34 to, when, for example, a GUT descriptive data acquisition request is notified, hold, as a request pattern different from the request pattern to which the previous request belongs, a termination request description table showing whether or not it should process the request or a request which will be notified the next time.

As one concrete example of the termination request description table, there can be considered a table in which identification information of each request which is included in all requests issued from the GUI node 1 to the service node 2 and which should be determined to be a termination request is registered. More specifically, every time when a request is notified, the request pattern management device 34 makes a search to determine whether or the identification information of the notified request is included in the termination request description table, and, when the identification information of the notified request is included in the termination request description table, makes preparations to determine that a request which will be notified the next time is a new actual request, and waits for the notification of the next request. In contrast, when the identification information of the notified request is not included in the termination request description table, the request pattern management device makes preparations to add a request which will be notified the next time to the request pattern to which the request notified previously belongs, and waits for the notification of the next request. At this time, the request pattern management device can add the current request determined to be a termination request to the request pattern to which the request notified previously belongs. Assuming that the reference is described in the termination request description table, the request pattern management device can determine to perform the addition to the request pattern according to the reference.

The termination request description table can be held fixedly by the request pattern management device 34. As an alternative, the GUI node 1 can acquire the termination request description table from the service node 2. Because the determination using the termination request description table which is suited to each service provided by the service node 2 can be performed by using the method of acquiring the termination request description table from the service node 2, the batch request can be generated with a higher degree of accuracy.

As a further example, the operation of a new request pattern management device 34 will be explained. The request pattern management device 34 uses, as a key, a request sent thereto according to a command for generating a request pattern outputted from the batch request processing device 33 to determine one or more requests which are predicted to be issued after the request. At this time, the request pattern management device sends a result in which a specific request is excluded from the one or more determined requests back to the batch request processing device 33. For example, when a request to change the state of the service node 2 (service state change request) is included in the one or more requests predicted to be issued succeedingly, the request pattern management device generates a batch request in a state in which the service state change request is included, and transmits the batch request to the service node 2. As a result, the service node 2 performs the service state change request, and the state of the service node is updated.

However, because it is not necessarily determined that the service state change request should be actually issued by the GUI node 1, the performance of the request may cause a state of the service node 2 which is not assumed by the GUI node 1. The request pattern management device 34 which receives the command for generating a request pattern from the batch request processing device 33 determines a corresponding request pattern from the request pattern data, and, after that, can update the request pattern to a request pattern which prevents such a state change as mentioned above which is not assumed by the GUI node 1 from occurring in the service node 2 by excluding a specific request from the request pattern. In the above-mentioned example, when a request categorized as the service state change request is included in the request pattern, the request pattern management device excludes the request from the request pattern to construct a new request pattern, and returns the request pattern to the batch request processing device 33.

Further, the request pattern management device 34 can be constructed so as to, when updating the request pattern data, perform a control operation of not storing the request which is the target to be excluded in the request pattern data, and so as not to, when receiving the command for generating a request pattern from the batch request processing device 33, perform the process of excluding the request which is the target to be excluded from the request pattern, instead of performing the above-mentioned process. Together with the use of either of the above-mentioned two types of processing methods, the information which is used as the criterion by which to determine whether or not the request pattern is the target for exclusion can be held as a fixed value in the GUI node 1. Further, by issuing a request for acquisition to the service node 2 at the time when, for example, the system is started, the information used as the criterion of determination can also be determined by using a criterion for the service node 2 which cooperates as the system.

In addition, instead of performing the above-mentioned process, the batch request can be generated with the request which is the target to be excluded being included in the batch request, and, after the batch request is issued from the GUI node 1 to the service node 2, the batch request interpretation device 42 of the service node 2 can perform determination of the request which is the target to be excluded, and notify an error response to the batch response generating device 45 without outputting the request determined to be the target to be excluded to the request processing device 43. In this case, when detecting the error response, the response processing device 36 of the GUI node 1 performs a control operation of not storing the error response in the response storage device 31.

Embodiment 4

Although the example in which the response processing device 36 stores the information including the responses included in the batch response received by the communication device 35 and corresponding to the performance request and the predicted request in the response storage device 31 is shown above-mentioned Embodiments 1 to 3, once the information is stored in the response storage device 31, the information continues to be stored if nothing is performed on the storage. However, there is a possibility that when the information continues to be stored indefinitely, the information enters a state in which it does not match the actual information which the service node 2 has. To solve this problem, according to this Embodiment 4, a control operation of deleting information including responses which are stored in the response storage device 31 at a certain time is performed.

As one method of deleting a response stored in the response storage device 31, there can be considered the following method.
When receiving a response storage request regarding a response from the response processing device 36, the response storage device 31 stores the response together with time information at the time of the reception. The response processing device 36 calculates the elapsed time since the start time of the storage for each of all the responses currently stored in the response storage device 31 at fixed time intervals, and, when the elapsed time of a response exceeds a fixed threshold, performs a control operation of deleting the response from the response storage device 31. By performing the above-mentioned control operation, the state in which a specific response continues to be stored eternally can be cancelled.

As another method of deleting a response, there can be considered the following method. When receiving a request for the acquisition of a response corresponding to a request from the response processing device 36, the response storage device 31 makes a search to determine whether or not a response to the specified request is stored, and, when a response to the specified request is stored, sends the response back to the response processing device 36. When a response to the request is stored, the response processing device 36 performs a control operation of deleting the response from the response storage device 31. By performing this control operation, the state in which a specific response continues to be stored eternally can be cancelled.

Although the above-mentioned control operation is explained as an example of deleting a response according to a first-time request for acquisition, it is not necessary to necessarily delete a response according to a first-time request for acquisition, and it is alternatively possible to delete a response according to an Nth-time request for acquisition. In this case, the response storage device 31 provides a region for storing how many times a request for acquisition has been issued for a response to be stored, and stores this response therein. When storing the response, the response storage device records 0 in the region, and increments the value every time when the response is processed according to a request for acquisition.
The response processing device 36 determines whether or not the value of the region is N, and deletes the response when the value becomes N.

As another method of deleting a response, there can be considered the following method. When generating a batch response, the batch response generating device 45 of the service node 2 incorporates, together with each response, information showing the expiration date of the response in the GUI node 1 (expiration date information), e.g., the number of references, the lifetime of the response, or the like into the batch response to generate the batch response. The response processing device 36 of the GUI node 1 which receives the batch response extracts each response included in the batch response and the expiration date information corresponding to the response, and stores them in the response storage device 31 by pairing them. When the expiration date information is the number of references, at the time of outputting a request for the acquisition of a response corresponding to a request to the response storage device 31, the response processing device 36 compares the expiration date information of the response corresponding to the request with the information about the number of references of the request, and, when the expiration date information is less than the information, performs a control operation of deleting the response from the response storage device 31.

As an alternative, when the expiration date information is the lifetime, the response processing device 36 calculates the elapsed time since the start time of the storage for each of all the responses stored in the response storage device 31 at fixed time intervals, and, when the elapsed time of a response exceeds a fixed threshold, performs a control operation of deleting the response from the response storage device 31. As to the expiration date information, the response processing device does not have to perform the process of storing the information in the batch response every time when generating the batch response. For example, an expiration date information table in which the expiration date information about each of all the responses is described can be defined and can be held by the GUI node 1, a response whose expiration date has passed can be determined by using the information stored in the expiration date information table, and the deleting process can be performed. As an alternative, there can be provided a method of making the service node 2 hold the expiration date information table, and providing the expiration date information table from the service node 2 to the GUI node 1 as a response to an explicit request for the acquisition of the expiration date information table from the GUI node 1.

Figure 33:
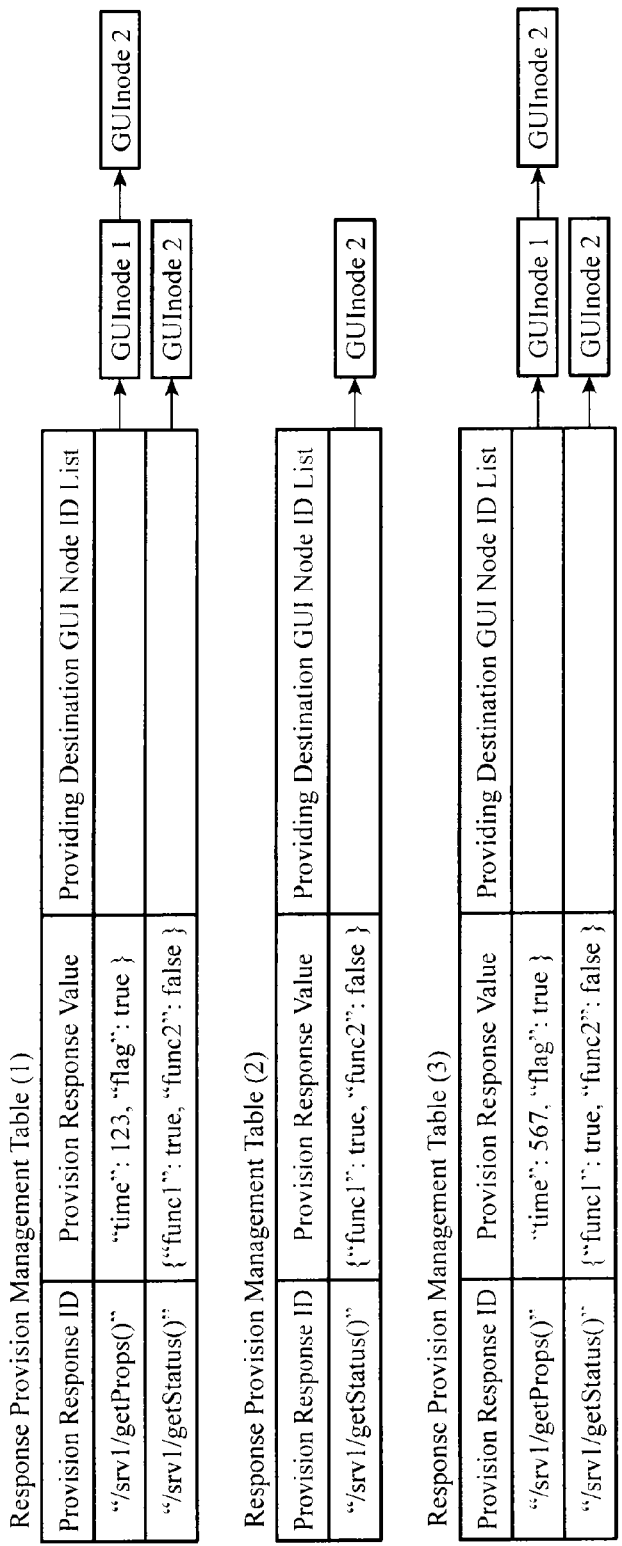
FIG. 33 is an explanatory drawing showing an example of a response provision management table.

As another method of deleting a response, there can be considered the following method. The batch response generating device 45 of the service node 2 includes a response provision manager that manages information showing to which GUI node 1 a response corresponding to which request is to be transmitted with what value when generating a batch response. For example, the response provision manager manages the information showing to which GUI node 1 a response corresponding to which request is to be transmitted with what value by using a response provision management table as shown in FIG. 33, or the like. The response provision management table includes provision response IDs each showing to which request the response corresponds, provision response values each showing a concrete value of the provided response, and providing destination GUI node ID lists each showing to which GUI node 1 the response is provided. However, when the GUI node 1 with which the service node 2 operates in cooperation is the only one existing in the system, the providing destination GUI node ID lists can be omitted.

The response provision management table (1) of FIG. 33 shows a state in which there are two types of responses provided to the GUI node 1. In this figure, an example in which as each provision response ID, a part of a URL which is a request corresponding to the response is extracted and described as an ID is shown. In the figure, an example in which as each provision response value, a value in a JSON form which is the response is stored is shown. In the figure, an example in which as each providing destination GUI node ID list, a part of the domain name of the GUI node 1 which is the source of request is extracted and described as an ID is shown. For example, the table shows that the response whose provision response ID is "/srv1/getProps( )" is provided to the two types of GUI nodes each having "GUInode1" or "GUInode2" as a part of its domain name.

It is assumed that in the state of this response provision management table (1), the batch response generating device 45 detects that all or a part of the value of the response whose provision response ID is, for example, "/srv1/get-Props( )" has been updated. In this case, the batch response generating device 45 issues a response deletion request event indicating a request for the deletion of the response whose response ID is "/srv1/getProps( )" from the response storage device 31 to the GUI node 1 which is JO registered in the providing destination GUI node ID list corresponding the provision response ID which is "/srv1/getProps( )."

FIG. 34 is an explanatory drawing showing an example of the description of the response deletion request event. In the example of FIG. 34, the response deletion request event is described as an array object in a JSON form. An event name which is identification information of the event is described by a first element, and a response ID which is a target to be deleted is described by a second element. It is not necessary to limit the identification information of the event to the event name, and an event identification number or the like which is defined for each event can be used. Further, although only one response ID which is a target to be deleted is provided in the example of FIG. 34, it is possible to enable response IDs which are a plurality of targets to be deleted to be described by using one response deletion request event, as a specification for describing response IDs which are targets to be deleted by client/server system using HTTP, a method of spontaneously sending information from the server device to a client terminal can be implemented by using Comet, Server-Sent Events, or WebSocket API.

After issuing the response deletion request event, the batch response generating device 45 deletes an element in which a response corresponding to the event is described from the response provision management table. For example, when the response deletion request event is issued for an element in which the response ID is "/srv1/get Props( )" in the state of the response provision management table (1) of FIG. 33, the batch response generating device deletes the corresponding element and updates the response provision management table to the state of the response provision management table (2) of FIG. 33. On the other hand, at the GUI node 1 which receives the response deletion request event, the response processing device 36 interprets the response deletion request event, and performs a control operation of deleting the response from the response storage device 31 by making a request of the response storage device 31 to delete the response corresponding to the response ID which is a target to be deleted. By performing the above-mentioned control operation, the state in which the response storage device 31 of the GUI node 1 continues storing the response until a mismatch occurs between the response stored in the response storage device 31 and the state in the service node 2.

Further, when detecting an update of a response value, the batch response generating device 45 can issue a response update request event instead of the response deletion request event. The response update request event is the one in which a request from the service node 2 to the GUI node 1 is described in such a way as to update a specific response stored in the response storage device 31 of the GUI node 1 to have the value of the response described in the event. FIG. 35 is an explanatory drawing showing an example of the description of the response update request event. In the example of FIG. 35, the response update request event is described as an array object in a JSON form. An event name which is identification information of the event is described by a first element, a response ID which is a target to be updated is described by a second element, and the value of a response to be updated is described by a third element. It is not necessary to limit the identification information of the event to the event name, and an event identification number or the like which is defined for each event can be used. Further, although only one set is described as the response ID to be updated and the value of the response to be updated in the example of FIG. 35, a plurality of sets can be described.

After issuing the response update request event, the batch response generating device 45 searches through the response provision management table for an element in which a response corresponding to the event is described, and rewrites the value of the response to be updated to the provision response value of the element. For example, when the response update request event shown in FIG. 35 is issued for the element in which the response ID is "/srv1/get Props( )" in the state of the response provision management table (1) of FIG. 33, the batch response generating device rewrites the value of the response which is to be updated according to the response update request event to the provision response value of the corresponding element to update the response provision management table to the state of the response provision management table (3) of FIG. 33.

Further, a limitation that limits responses for each of which the response update request event is issued to some responses can be imposed. For example, a response corresponding to a request for the performance of an API for referring to an internal variable held by the service node 2 is frequently updated with a change in the internal state of the service node 2. On the other hand, a response corresponding to a request for the performance of an API which calls a specific function of a service and returns a process success or failure flag as a response returns a success flag in many cases when processed normally, and is therefore updated with a low frequency.

Therefore, the response update request event can be issued only for a response which is requested frequently and which is associated with a reference request API having a variable showing the above-mentioned internal state of the service node in which the response is updated frequently. In this case, the issue can be implemented by providing the batch response generating device 45 with a function of, when the batch response generating device 45 constructs the response provision management table, determining whether the response corresponds to the request which is the target to which the response update request event is issued, and, when the response is not the target for issue, skipping a process of registering to the response provision management table.

In addition, the process of referring to the internal state of the service node 2, which is performed by the GUI node 1, can be assumed to change greatly dependently upon the GUI contents currently being processed by the GUI node 1. Therefore, there can be considered a method of managing the response provision management table which the batch response generating device 45 has according to the GUI descriptive data, thereby being able to prevent the occurrence of an event. In the service node 2 which receives a request for the acquisition of the GUI descriptive data, the batch response generating device 45 can delete the response provision management table which the batch response generating device has constructed until then, and construct a new response provision management table. In this case, when a plurality of GUI nodes 1 each of which operates in cooperation with the service node 2 exist, the batch response generating device 45 can construct a response provision management table to manage for each of the GUI nodes 1, and, when receiving a request for the acquisition of the GUI descriptive data from each of the GUI nodes 1, can cope by deleting only the response provision management table corresponding to the GUI node 1 even when the service node operates in cooperation with the plurality of GUI nodes 1. Further, it is not necessary to delete the corresponding response provision management table by using only a request for the acquisition of the GUI descriptive data as a trigger. As an alternative, the reception of one or more specific requests or the reception of a specific request for which a parameter is set can be used as a trigger.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The present invention is suitable for use in a communication system that needs to sufficiently reduce the number of times that network communications associated with a cooperative process are performed.

EXPLANATIONS OF REFERENCE NUMERALS

1 GUI node (client terminal), 2 service node (server device), 3 network, 11 GUI processing module, 12 display, 13 input interface, 14 output interface, 21a, 21b, and 21c service module (response generator), 22 service providing module, 31 response storage device (response storage), 32 GUI processing device (performance request issuer), 33 batch request processing device (request pattern generator), 34 request pattern management device (request pattern generator), 35 communication device (communicator), 36 response processing device (response processor), 41 communication device (request pattern receiver, response transmitter), 42 batch request interpretation device (response acquiring unit), 43 request processing device (response acquiring unit), 44a, 44b, and 44c service performing device (response generator), 45 batch response generating device (response acquiring unit), 46 response storage device (response acquiring unit).

The invention claimed is:

1. A communication system including a client terminal that issues a request for performance of a service, and a server device that sends a response corresponding to the performance request issued by said client terminal back to said client terminal, wherein said client terminal comprises:
a response storage that stores a response sent back thereto by said server device;
a performance request issuer that issues a request for performance of a service;
a request pattern generator that, when no response corresponding to said performance request issued by said performance request issuer is stored in said response storage, predicts a request which may be issued following said performance request, and generates a request pattern including the predicted request and said performance request; and
a response processor that, when responses corresponding to said performance request and said predicted request included in said request pattern are received from said server device, stores the responses corresponding to said performance request and said predicted request in said response storage and also outputs the response corresponding to said performance request to said performance request issuer.

2. The communication system according to claim 1, wherein when a response corresponding to the performance request issued by said performance request issuer is stored in said response storage, said request pattern generator outputs an output command for commanding an output of said response to said performance request issuer, and, when receiving said output command from said request pattern generator, said response processor outputs the response stored in said response storage and corresponding to the performance request to said performance request issuer.

3. The communication system according to claim 1, wherein the server device comprises:
one or more response generators each of that generates a response corresponding to each of various performance requests;
a request pattern receiver that receives the request pattern transmitted from the client terminal;
a response acquiring unit that, for each of the requests included in the request pattern received by said request pattern receiver, specifies a response generator that performs a service corresponding to said each request, and provides said each request to said response generator to acquire a response generated by said response generator; and
a response transmitter that collectively transmits responses acquired by said response acquiring unit and corresponding to the requests to said client terminal.

4. The communication system according to claim 3, wherein when a request included in the request pattern received by the request pattern receiver is a specific one, the response acquiring unit commands the response transmitter to make a notification of an error response to the client terminal.

5. The communication system according to claim 3, wherein the response processor deletes a response satisfying a predetermined deletion condition among one or more responses stored in the response storage.

6. The communication system according to claim 5, wherein when the deletion condition is a storage period, the response processor deletes a response whose period during which the response is stored in the response storage exceeds said storage period.

7. The communication system according to claim 5, wherein when the deletion condition is a number of references, the response processor deletes a response whose number of times that the response has been outputted to the performance request issuer exceeds said number of references.

8. The communication system according to claim 5, wherein the response acquiring unit sets a deletion condition for the response generated by the response generator, and, when transmitting the response corresponding to each of the requests to the client terminal, the response transmitter transmits the deletion condition set by said response acquiring unit to said client terminal.

9. The communication system according to claim 1, wherein the request pattern generator performs a process of managing a history of performance requests issued by the performance request issuer, and, after a certain performance request is issued, and also updating issuing frequency with which a performance request has been issued following said performance request, and also performs a process of, when a performance request is newly issued by said performance request issuer, determining said performance request as a first element of the request pattern, and also determining a performance request having highest issuing frequency, among performance requests which were issued following said performance request in a past, as a next element of said request pattern, and repeatedly performs the process of determining the next element of said request pattern one or more times.

10. The communication system according to claim 9, wherein the request pattern generator performs a process of managing the history of the performance requests issued by the performance request issuer for each screen displayed on a GUI, and updating the issuing frequency of the performance request, and, even if the performance request newly issued by said performance request issuer is the same performance request, may generate a different request pattern when screens displayed on the GUI differ from each other.

11. The communication system according to claim 1, wherein the request pattern generator generates the request pattern such that a number of requests included in the request pattern does not exceed a preset upper limit number.

12. The communication system according to claim 1, wherein when a time difference between an issuing time of a performance request issued previously by the performance request issuer and that of a performance request issued currently is equal to or greater than a threshold, the request pattern generator includes the performance request issued previously and the performance request issued currently in different request patterns.

13. The communication system according to claim 1, wherein the request pattern generator generates the request pattern such that a specific request is not included in the request pattern.

14. The communication system according to claim 13, wherein the request pattern generator does not include a request for change of a state of a service performed by the server device in the request pattern as the specific request.

15. A client terminal comprising:
a response storage that stores a response sent back thereto by a server device;
a performance request issuer that issues a request for performance of a service;
a request pattern generator that, when no response corresponding to said performance request issued by said performance request issuer is stored in said response storage, predicts a request which may be issued following said performance request, and generates a request pattern including the predicted request and said performance request; and
a response processor that when responses corresponding to said performance request and said predicted request included in said request pattern are received from said server device, stores the responses corresponding to said performance request and said predicted request in said response storage and also outputs the response corresponding to said performance request to said performance request issuer.

16. A server device comprising:
one or more response generators each of that generates a response corresponding to each of various performance requests from a client terminal that issues a request of the server to perform a service;
a request pattern receiver that receives a request pattern transmitted from the client terminal, the request pattern including at least one performance request for a service and at least one predicted request predicted by the client terminal that predicts a request that may be issued by the client terminal following the performance request;
a response acquiring unit that, for each performance request and predicted request included in the request pattern received by said request pattern receiver, specifies a response generator that performs a service corresponding to said each performance request and predicted request, and provides said each performance request and predicted request to said specified response generator to acquire a response generated by said response generator; and
a response transmitter that collectively transmits responses acquired by said response acquiring unit and corresponding to the at least one performance request and the at least one predicted request to said client terminal.

17. The server device according to claim 16, wherein the response acquiring unit generates a batch response by combining the responses to the individual requests included in the request pattern, and
the response transmitter transmits the generated batch response to the client terminal.

18. The server device according to claim 16, wherein the response acquiring unit outputs the at least one performance request to said specified response generator prior to outputting the at least one predicted request to said specified response generator.

* * * * *